United States Patent
Babu et al.

(10) Patent No.: US 10,587,571 B2
(45) Date of Patent: *Mar. 10, 2020

(54) PORT CHUNK ALLOCATION IN NETWORK ADDRESS TRANSLATION

(71) Applicant: CISCO TECHNOLOGY, INC., San Jose, CA (US)

(72) Inventors: Prakash Babu, Bangalore (IN); Jed Kaplan, Lowell, MA (US); Christopher J. Skowronek, North Andover, MA (US); Janakiraman Senthilnathan, Nashua, NH (US); Arun Seshadri, Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 458 days.

This patent is subject to a terminal disclaimer.

(21) Appl. No.: 14/796,352

(22) Filed: Jul. 10, 2015

(65) Prior Publication Data

US 2015/0341309 A1 Nov. 26, 2015

Related U.S. Application Data

(63) Continuation of application No. 12/861,517, filed on Aug. 23, 2010, now Pat. No. 9,083,587.

(60) Provisional application No. 61/235,738, filed on Aug. 21, 2009.

(51) Int. Cl.
*G06F 15/16* (2006.01)
*H04L 29/12* (2006.01)

(52) U.S. Cl.
CPC ...... *H04L 61/203* (2013.01); *H04L 29/12367* (2013.01); *H04L 29/12377* (2013.01); *H04L 61/256* (2013.01); *H04L 61/2514* (2013.01); *H04L 61/2517* (2013.01); *H04L 61/2521* (2013.01); *H04L 61/2567* (2013.01); *H04L 61/2575* (2013.01)

(58) Field of Classification Search
None
See application file for complete search history.

(56) References Cited

U.S. PATENT DOCUMENTS

| | | | | |
|---|---|---|---|---|
| 7,283,542 B2* | 10/2007 | Mitchell | ............ | H04L 29/06 370/352 |
| 7,328,280 B2* | 2/2008 | Takeda | ............ | H04L 29/12066 709/220 |
| 7,386,881 B2* | 6/2008 | Swander | ............ | H04L 63/08 370/392 |
| 7,606,191 B1* | 10/2009 | Breau | ............ | H04L 12/4641 370/328 |
| 7,738,468 B2* | 6/2010 | Standridge | ............ | H04L 29/12377 370/401 |
| 9,083,587 B2 | 7/2015 | Babu et al. | | |

(Continued)

*Primary Examiner* — Dhairya A Patel
(74) *Attorney, Agent, or Firm* — Patterson + Sheridan, LLP

(57) ABSTRACT

A system and method for providing network and port address translation is provided. A global IP address and a block (chunk) of ports are allocated for each mobile subscriber (MS) on first data connection. Subsequent data connections from the same MS are assigned the same IP address and a new port from this block. The mapping information is communicated, processed, and stored once for the complete block, instead of for every new data connection. This process reduces processing, communication, and storage requirements.

19 Claims, 11 Drawing Sheets

(56) References Cited

U.S. PATENT DOCUMENTS

| | | | |
|---|---|---|---|
| 2003/0048766 A1* | 3/2003 | D'Annunzio | H04B 7/18508 370/338 |
| 2004/0076180 A1* | 4/2004 | Satapati | H04L 12/4604 370/467 |
| 2004/0190549 A1* | 9/2004 | Huitema | H04L 29/12358 370/466 |
| 2004/0264449 A1* | 12/2004 | Klaghofer | H04L 29/12452 370/389 |
| 2006/0075127 A1* | 4/2006 | Juncker | H04L 29/12009 709/229 |
| 2006/0265508 A1* | 11/2006 | Angel | H04L 29/12047 709/230 |
| 2007/0086462 A1* | 4/2007 | Zhang | H04L 63/029 370/392 |
| 2007/0094411 A1* | 4/2007 | Mullane | H04L 29/12066 709/245 |
| 2007/0147421 A1* | 6/2007 | Kim | H04L 12/66 370/466 |
| 2007/0153782 A1* | 7/2007 | Fletcher | H04J 3/1617 370/389 |
| 2008/0201486 A1* | 8/2008 | Hsu | H04L 29/06 709/238 |
| 2009/0303989 A1* | 12/2009 | Franke | H04L 12/6418 370/389 |
| 2009/0319676 A1* | 12/2009 | Jin | H04L 65/1093 709/228 |
| 2010/0014459 A1* | 1/2010 | Mir | H04L 45/60 370/328 |
| 2010/0332626 A1* | 12/2010 | Jonsson | H04L 29/1282 709/220 |
| 2011/0047256 A1 | 2/2011 | Babu et al. | |
| 2013/0290517 A1* | 10/2013 | Hwang | H04L 29/06517 709/224 |

\* cited by examiner

FIG. 3A

| 0 | 1 | 2 | 3 | 4 | 5 | 6 | 7 | 8 | 9 | 0 | 1 | 2 | 3 | 4 | 5 | 6 | 7 | 8 | 9 | 0 | 1 | 2 | 3 | 4 | 5 | 6 | 7 | 8 | 9 | 0 | 1 |
|---|---|---|---|---|---|---|---|---|---|---|---|---|---|---|---|---|---|---|---|---|---|---|---|---|---|---|---|---|---|---|---|
| Code | | | | | | | | Identifier | | | | | | | | Length | | | | | | | | | | | | | | | |
| Authenticator | | | | | | | | | | | | | | | | | | | | | | | | | | | | | | | |
| Authenticator | | | | | | | | | | | | | | | | | | | | | | | | | | | | | | | |
| Authenticator | | | | | | | | | | | | | | | | | | | | | | | | | | | | | | | |
| Authenticator | | | | | | | | | | | | | | | | | | | | | | | | | | | | | | | |
| Attributes .... | | | | | | | | | | | | | | | | | | | | | | | | | | | | | | | |

FIG. 3B

| 0 | 1 | 2 | 3 | 4 | 5 | 6 | 7 | 8 | 9 | 0 | 1 | 2 | 3 | 4 | 5 | 6 | 7 | 8 | 9 | 0 | 1 | 2 | 3 | 4 | 5 | 6 | 7 | 8 | 9 | 0 | 1 |
|---|---|---|---|---|---|---|---|---|---|---|---|---|---|---|---|---|---|---|---|---|---|---|---|---|---|---|---|---|---|---|---|
| Type | | | | | | | | Length | | | | | | | | Vendor id (8164) | | | | | | | | | | | | | | | |
| Vendor Id (cont) (8164) | | | | | | | | | | | | | | | | Vendor Type(216) | | | | | | | | Vendor Length | | | | | | | |
| Sub Type (=1) | | | | | | | | Length(4) | | | | | | | | Value (NAT-IP-Address) | | | | | | | | | | | | | | | |
| Value (NAT-IP-Address) cont | | | | | | | | | | | | | | | | Sub Type (=2) | | | | | | | | Length(2) | | | | | | | |
| Value (NAT-port-block-start) | | | | | | | | | | | | | | | | Sub Type (=3) | | | | | | | | Length(2) | | | | | | | |
| Value (NAT-port-block-end) | | | | | | | | | | | | | | | | Sub Type (=4) | | | | | | | | Length(1) | | | | | | | |
| Value (Alloc-flag) | | | | | | | | Sub Type (=5) | | | | | | | | Length(1-253) | | | | | | | | Value(=Correlation-ID ) | | | | | | | |
| Sub Type (=6) | | | | | | | | Length(2) | | | | | | | | Value (Loading Factor) | | | | | | | | | | | | | | | |
| Sub Type (=7) | | | | | | | | Length(4) | | | | | | | | Value (binding timer) | | | | | | | | | | | | | | | |
| Value (binding timer) | | | | | | | | | | | | | | | | | | | | | | | | | | | | | | | |

//

PORT CHUNK ALLOCATION IN NETWORK ADDRESS TRANSLATION

CROSS-REFERENCE TO RELATED APPLICATIONS

This application is a continuation ( and claims the benefit of priority under 35 U.S.C. § 120) U.S. application Ser. No. 12/861,517, filed Aug. 23, 2010, entitled "Port Chunk Allocation in Network Address Translation," Inventors Prakash Babu, et al. The disclosure of the prior application is considered part of (and is incorporated by reference in) the disclosure of this application. This application claims benefit under 35 U.S.C. § 119(e) of U.S. Provisional Patent Application No. 61/235,738, entitled "Port Chunk Allocation in Network Address Translation," filed Aug. 21, 2009, which is hereby incorporated by reference herein in its entirety.

TECHNICAL FIELD

The present disclosure relates generally to network address and port translation in telecommunications.

BACKGROUND

Wireless networks are telecommunications networks that use radio waves to carry information from one node in the network to one or more receiving nodes in the network. Wired communication can also be used in portions of a wireless network, such as in the core network. Cellular telephony is characterized by the use of radio cells that provide radio coverage for a geographic area, with multiple cells arranged to provide contiguous radio coverage over a larger area. Mobile devices use radio waves to communicate with the cellular radio cells, and the mobile devices can move from one cellular radio cell to another.

Mobile data service providers are facing shortage of IPv4 IP address. Network Address Translation (NAT) addresses this concern by sharing an IP address among many mobile subscribers instead of assigning separate IP address for each Mobile Subscriber (MS). NAT works by assigning private (not globally unique) IPv4 address to each MS for use internally and translating the private IP address and source port information to a globally unique IP address. This involves assigning a different port for each data connection from mobile device. The NAT mapping is computed when the first data packet arrives at the NAT for each new data connection. NAT does an IP address and port translation on all subsequent data packets on the same data connection. NAT also does a reverse translation of packets arriving from the public network that are destined to the MS. With address and port translation, this process is also sometimes called Network Address and Port Translation (NAPT). The mapping information from NAT can be communicated to other systems for real time usage and for future usage as well. However, the amount of mapping information generated for a given MS can be very large, running into thousands of mappings, which needs to be communicated, processed, and stored. This process can create a bottleneck in scalable high performance systems.

OVERVIEW

In some embodiments a method is provided that includes receiving, at the gateway, a first packet of a first data connection, checking the first packet to determine if a NAT allocation is to be made, allocating to the first data connection a public IP address, which can be used to communicate with an Internet, a chunk of ports, and a private IP address that can be used to communicate with a network, mapping the public IP address and the chunk of ports to the private IP address, and modifying a first header of the first packet to include the private IP address when the first packet is received from the Internet.

BRIEF DESCRIPTION OF THE DRAWINGS

FIG. 3A-3B illustrate messaging for communicating with other devices in accordance with certain embodiments;

DETAILED DESCRIPTION

This application relates to network address and port translation in telecommunications. Mobile data service providers are facing shortage of IPv4 IP address. Network Address Translation (NAT) addresses this concern by remapping globally unique public IP addresses onto private IP address that might not be unique globally. A NAT device serves to translate the private IP addresses and source port information to the globally unique IP addresses allowing for more efficient usage of the public IP addresses. The NAT device can track mappings between private and public IP addresses by assigning a different port for each data connection from a mobile subscriber. In communication networks that are scalable and distributed to serve large numbers of mobile subscribers, the mapping information can quickly grow to thousands of mappings. A solution to this problem is to change how the NAT mappings are made to allow more efficient processing, storage, and communication of these mappings.

In some embodiments, a global IP address and a block (chunk) of ports can be allocated for each mobile subscriber (MS) upon receipt of a first data connection (e.g., a voice call or a video stream) received at the gateway. Subsequent data connections from the same MS are assigned the same IP address and a new port from this block of ports. Mapping information is communicated, processed, and stored once for the complete block, instead of separately for each new data connection. A data connection can be characterized by address information, port information and protocol information to determine that a connection is unique. This process can reduce processing, communication, and storage requirement by the size of the block. In case no free port is available in the port block, a new port block is allocated and a port is assigned. This mapping is updated to indicate the association of the subscriber with an address and the allocated block of ports.

Figure 1:
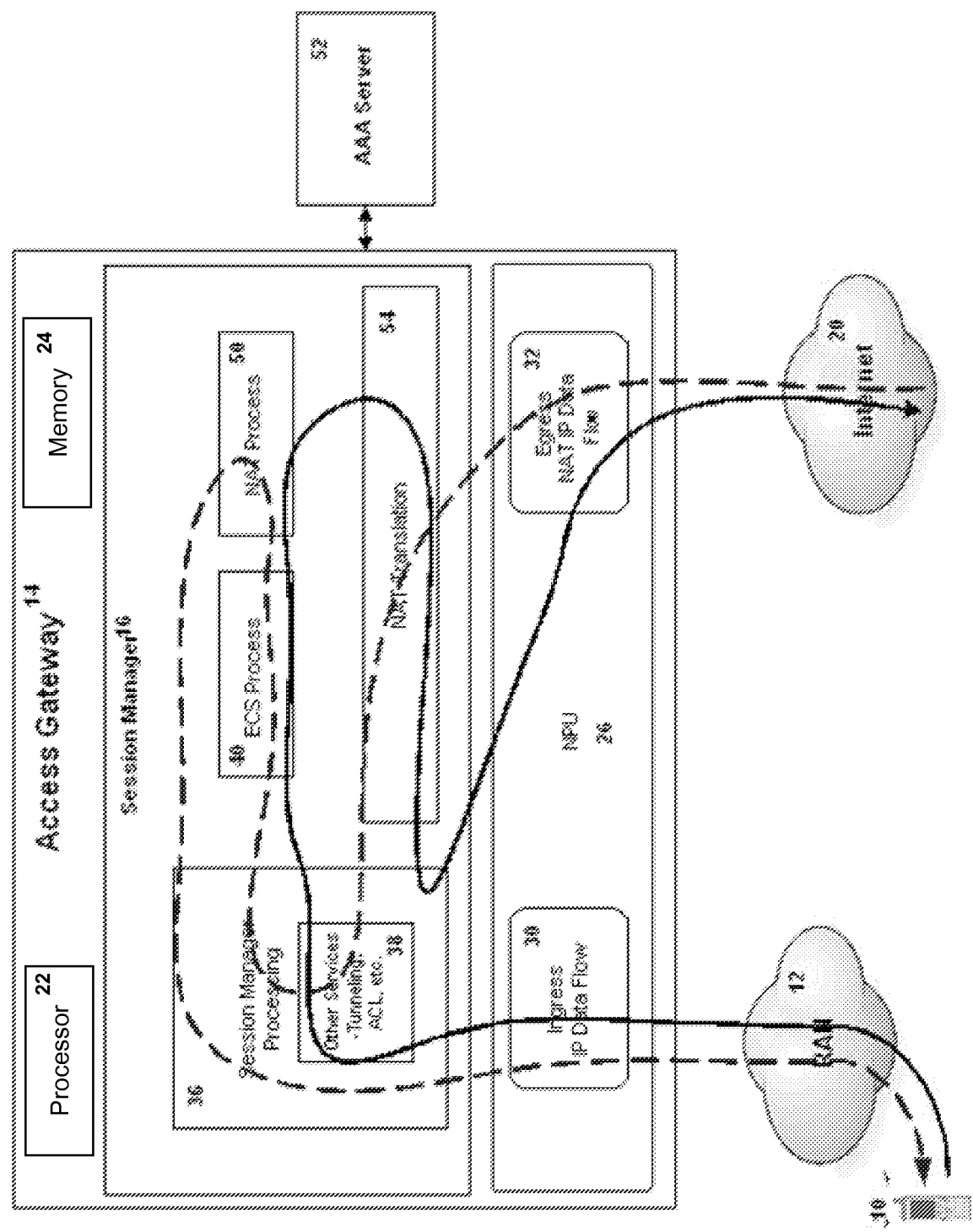
FIGS. 1-2 are block diagrams showing an architecture for network address translation (NAT) and packet flows through a gateway in accordance with certain embodiments.

FIG. 1 illustrates a logical architecture of a gateway that implements the NAT functionality described in accordance with some embodiments. The system includes a mobile subscriber 10, a radio access network (RAN) 12, an access gateway 14, an AAA server 52, and an Internet 20. Gateway 14 can provide various functionalities and connectivity in a communication network. For example, gateway 14 can implement one or more access gateway functionalities such as a gateway GPRS support node (GGSN), a packet data serving node (PDSN), a home agent (HA), a PDN gateway (PGW), a serving gateway (SGW), or any other access gateway. The gateway 14 also includes session manger 16 that is implemented on processor 22 and memory 24. Other modules on access gateway 14 can be implemented using processor 22 and memory 24. Another device implemented in hardware is NPU 26.

Network processing unit (NPU) 26 can implement one or more data flows such as ingress IP data flow 30 and egress IP data flow 32. IP data flow 30 and IP data flow 32 implement packet directors that match one or more packet characteristics to forward a packet to particular Session Manager 16 for processing. The characteristics can include information in the header of the packet such as address information, port information, and type. Session manager 16 further includes network session manager 36, other services module 38, an enhanced charging service (ECS) process module 40, a NAT process module 42 and NAT Translation 54. Other services module 38 can provide tunneling services, an access control list, and other types of services. Enhanced charging service (ECS) process module 40 can be used to perform analysis of packets including shallow packet and deep packet inspection, which can be used for charging a subscriber among other things.

In some embodiments, NAT functionality can be broken into two modules NAT process module 50 and NAT translation module 54. The NAT process module 50 performs the setup of NAT services for data connections including allocating a public IP address, a private IP address, and a chunk of ports as well as associating a port from the chunk of ports with a data connection and mapping NAT information. The NAT translation module 54 processes the packet to translate between a public IP address and a private IP address. The NAT translation module 54 can access a database in memory 24 to obtain mapping information for an active data connection.

In operation, when a packet arrives from the mobile subscriber or user equipment 10 at gateway 14, it is received at NPU 26. The NPU 26, using a flow can direct the packet to the appropriate session manager 16. Session manger 16 can perform processing through a session manager processing module 36 that can include a variety of different services or the coordination of the different services. For example, the session manager 36 performs the coordination of NAT services such as NAT translation on the packet before sending the packet to Internet 20. In some embodiments, the processing at session manager 16 is performed by dedicated modules such as NAT process module 50 and NAT translation module 54. The packet passes through other services module 38 where an access control list (ACL) can be used to determine whether ECS process 40 is to be applied based on ACL services 38.

Within ECS process module 40, whether NAT 50 is to be applied can be determined based on user configuration. The ECS process module 40 can use an analyzer to determine whether to provide NAT services. Once it is determined that NAT is to be applied, NAT translation 54 is performed and a corresponding Egress NAT IP data flow 32 is installed, if already not installed. The egress NAT IP data flow 32 can direct NATed packets to NAT translation module 54 in order to translate the packets back. Mapping information that describes how ports, private IP addresses, and public IP addresses correspond with one another is generated as data connections are setup. This mapping information can be maintained in the access gateway 14. The access gateway 14 can also communicate mapping information to AAA server 52, which can be used when a user equipment 10 is handed of from one gateway to another gateway.

When a packet arrives at gateway 14 from Internet 20 the packet is matched against NPU flows, such as Egress NAT IP data flow 32. If an NPU flow matches and if it is Egress NAT data IP flow 32, the packet can be sent to NAT translation module 54 where NAT translation is performed. The packet can then be sent to session manger processing module 36 for further processing. Whether the packet is sent to ECS process module 40 for ECS processing is determined based on ACL services of other services module 38. Once all processing is done, the packet is sent to user equipment or mobile subscriber 10.

Figure 2:
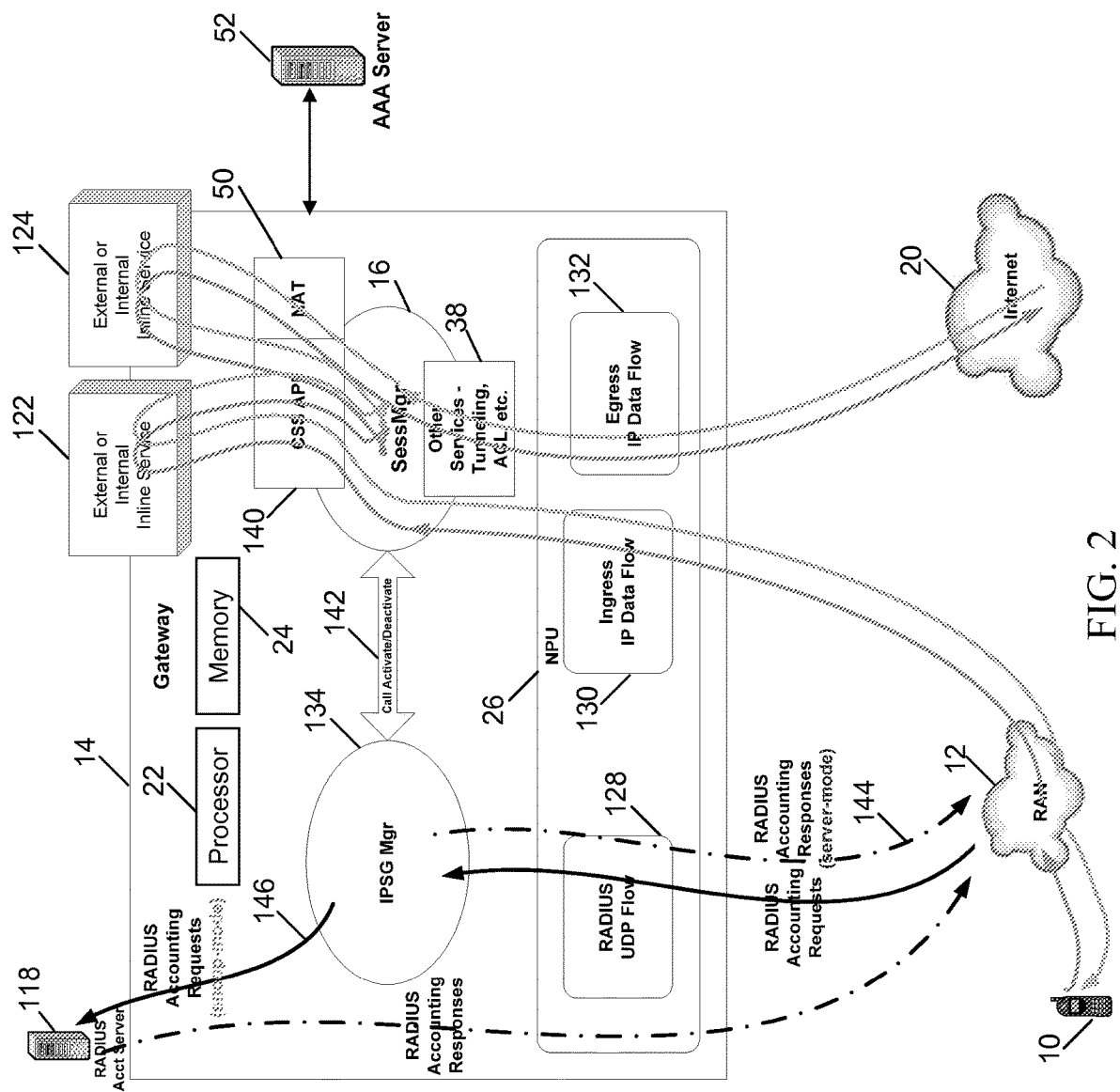
Figure 4A:
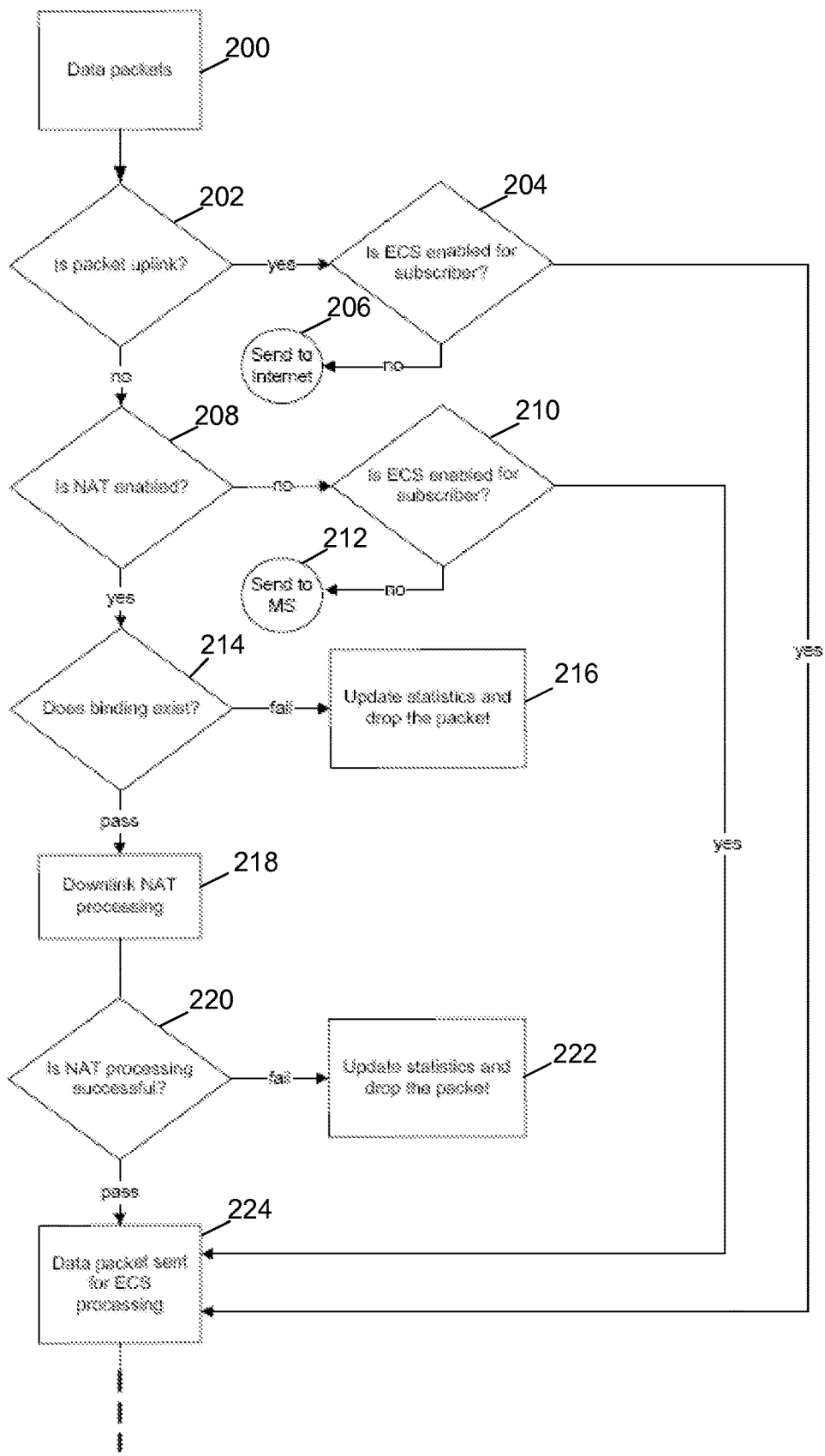
FIGS. 4A-4D are a flow diagram showing operation of NAT processing in accordance with certain embodiments.
Figure 4B:
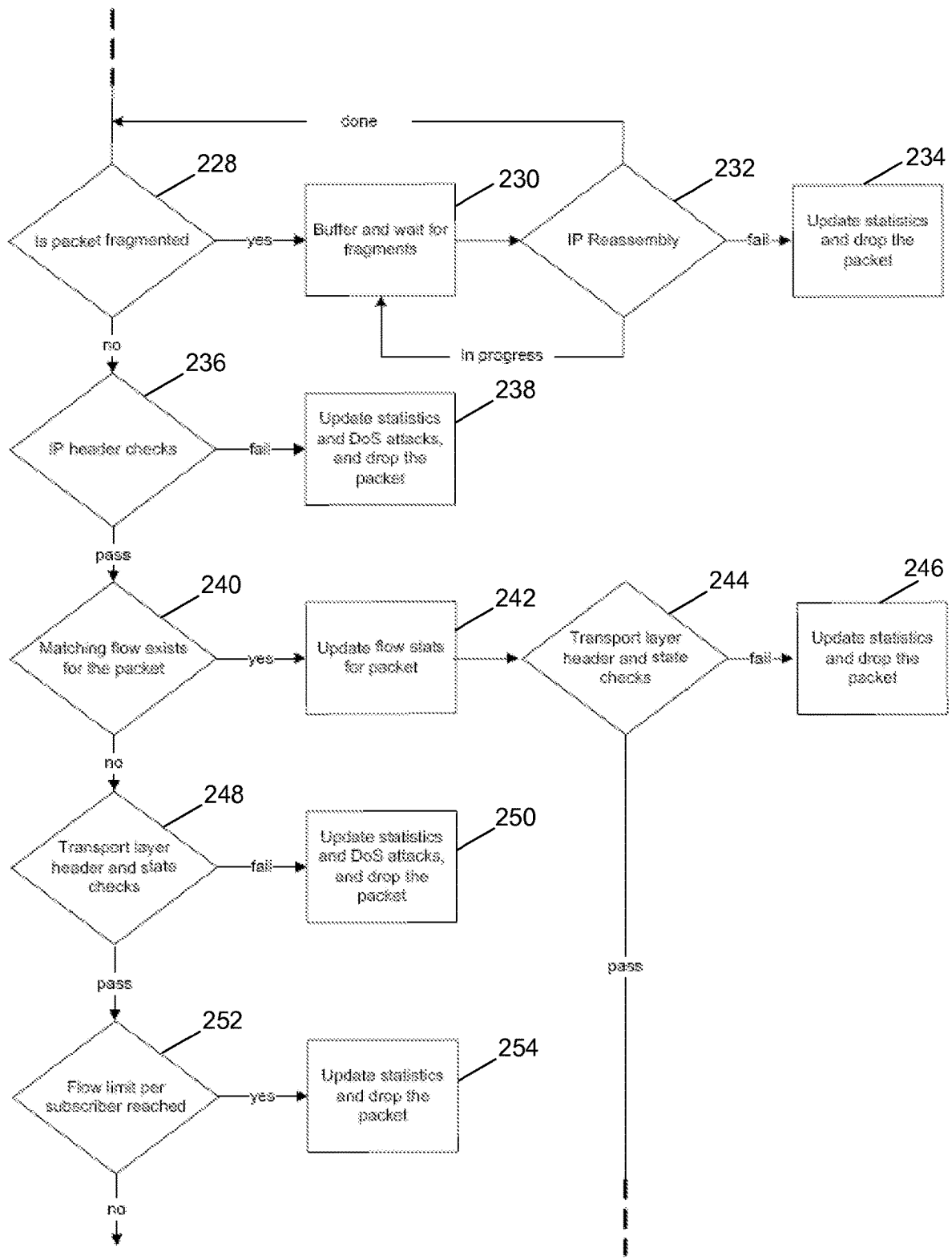
Figure 4C:
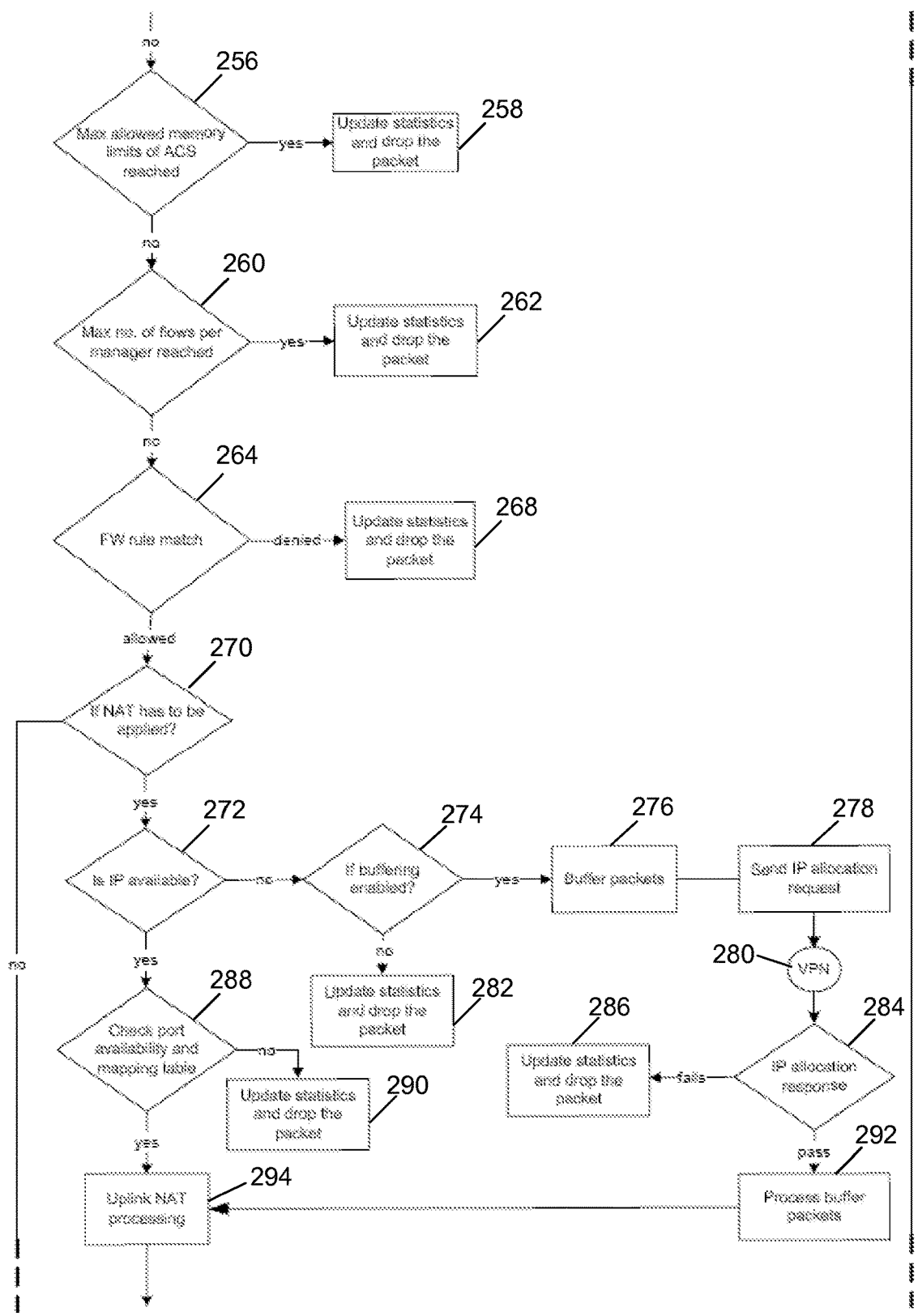
Figure 4D:
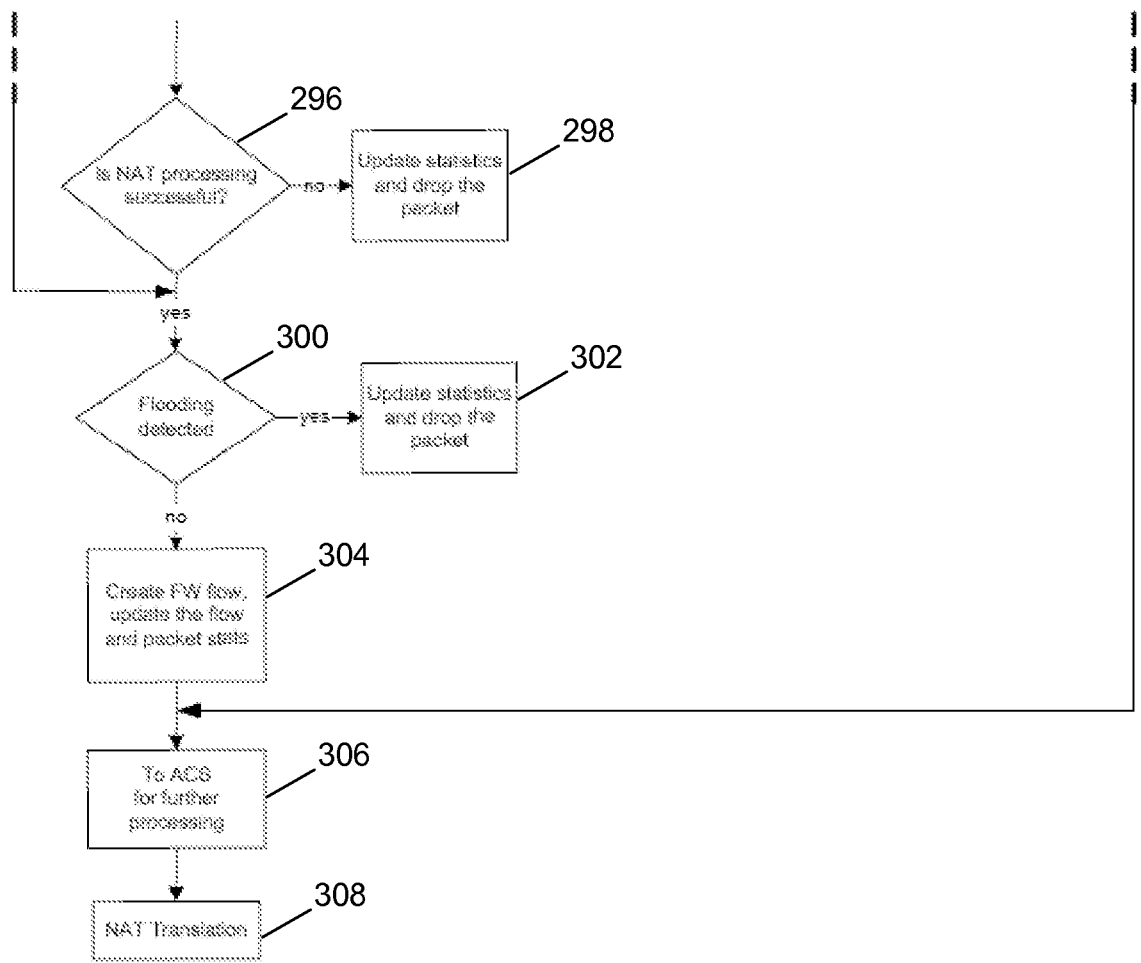

FIG. 2 illustrates an alternate embodiment for providing NAT functionality to a packet passing through a gateway. In some embodiments, NAT functionality or a NAT device can be implemented on a router or gateway in a communications network. The system includes a mobile subscriber or user equipment 10, a radio access network (RAN) 12, an access gateway 14, a server 118, an Internet 20, and an external or internal in-line service 122 and 124. Gateway 14 includes network processing unit (NPU) 26, data connection flow 128, ingress IP data flow 130, egress IP data flow 132, IP signaling gateway (IPSG) manager 134, session manager 16, other services module 38, content service steering (CSS) application program interface (API) 140, and module communication 142. Data connection flow 128, ingress IP data flow 130, egress IP data flow 132, IPSG manager 134, and session manager 16 can be implemented in software, logic, or firmware, for example, and can be used to provide the services to a packet flow. A processor 22 and memory 24 can implement modules that store information in memory 24 and are processed by processor 22.

Data connection flow 128 can be used to monitor new data connections received at a gateway from a mobile subscriber. The flow can monitor messages by checking messages for certain information and if message meets certain criteria sending the message to the IPSG manager or another module for deep packet inspection, in certain embodiments. The "flows" can be setup on NPU 126 to detect, inspect, process, and otherwise redirect incoming or outgoing packets. These flows can be implemented as tasks that run on a hardware processing unit. The tasks can be software that is capable of comparing fields in the packet with a defined criteria and then taking an action based on one or more rules. The rules can be a logic that prescribe actions for different types of matches. The data connection flow 128 can be a TCP/UDP flow, where data connection flow 128 detects new TCP/UDP connection requests, for example. The ingress IP data flow 130 can be setup to receive tunneled data session packets from mobile subscribes from protocols such as mobile IP (MIP), GTP (GPRS tunneling protocol), A10/A11, or S5/S8. The egress IP data flow 132 can support NAT processing in some embodiments.

The new connection requests are received by the IPSG manager 134 for processing. The IPSG manager 134 inspects the messages to activate and deactivate sessions in gateway 14. During the inspection of the messages by IPSG manager 134, information is also obtained that can be used to setup the session, authenticate the session, and link the session to a subscriber profile. This information can be sent to session manager 16 through module communication 142, which may be implemented in any combination of hardware or software.

IPSG manager 134 can function in at least two modes relating to the handling of data connection requests received from access equipment. IPSG manager 134 can be in a server mode in which the connection requests are addressed to gateway 14 and IPSG manager 134 issues responses 144. IPSG manager 134 can be in an inspect mode and the messages are not addressed to the gateway, so the messages are directed to the IPSG manager 134 by NPU 26, through a flow such as flow 128. At IPSG manager 134, the messages are inspected and information is extracted before the message is forwarded 146. In both modes, the messages are inspected and information is extracted and sent to session manager 16. IPSG manager 134 can inspect data connection setup and teardown packets or messages to activate and deactivate sessions by way of communication module 142. An internal inline service, such as inline service 122, can be used to monitor control signaling packets and determine how to modify a packet stream.

Session manager 16 can create at least one IP data flow, which can include IP data flows 130 and 132. Egress IP data flow 132 is the more likely to be implemented for streaming media because the stream is provided via a downlink. However, both IP flows can be used when a user is engaged in video telephony or gaming on the mobile node because both an uplink and downlink are used. Ingress IP data flow 130 indicates to session manager 16 that the packet is coming from mobile subscriber 10 so that session manager 16 can relay the packet or provide services such as network address translation.

When a packet arrives at egress IP data flow 132, a similar process takes place. Egress IP data flow 132, like ingress IP data flow 130, recognizes packets on a subscriber session basis and forwards the packets to session manager 16 for relaying or providing services such as network address translation. When a new session is activated and session manager 16 receives the extracted information from IPSG manager 134, session manager 16 can authenticate the call to load the subscriber profile, in certain embodiments. The authentication can involve the NAI, the MSID, the user name and password, or any other authentication attribute of mobile subscriber or user equipment 10. The subscriber profile includes configuration information such as the subscriber access control list (ACL), the corresponding CSS redirections, and other services applied for this subscriber. When the call is authenticated or authorized, then the dynamic QoS on a per-session basis is setup and data flow begins. The session manager may also authenticate the subscriber with a PCRF so the PCRF can send instructions regarding QoS.

CSS API 140 is a module that defines how packet flows are handled by the gateway 14 based on the content of the packets, including information in a packet header. The content service steering (CSS) API 140 includes features such as load balancing, network address translation (NAT), HTTP redirection, and DNS redirection. The CSS API 140 can use information obtained from a subscriber profile to both select appropriate content service providers (e.g., the in-line service or external content server) and route the packet flows in a load balanced fashion. The load balancing can be accomplished by a number of algorithms such as round robin, least loaded, destination hashing, and normalized response time monitoring. By monitoring the health of external servers, the CSS API 140 can redirect packet flows if an external server fails. The CSS API 140 can direct packets to an enhanced charging service (ECS) in conjunction with dynamic quality of service.

Network Address Translation (NAT)

NAT functionality is used to translate non-routable private IP addresses to one or more routable public IP addresses from a pool of public IP addresses that have been assigned to the NAT. NAT functionality conserves the number of public IP addresses required to communicate with external networks; it also ensures security, as the IP address scheme for the internal network is masked from external hosts, and each outgoing and incoming packet is translated. NAT can be used to perform address translation for simple-IP and mobile-IP.

Gateway 14 communicates with a server, such as an authentication, accounting, and authorizing (AAA) server 52, to maintain information about NAT mappings. These communications can be through an interface that allows for sending and receiving data on the network. These mappings typically need to be updated every time a new data connection is opened and a new address and/or port is assigned. However, with the chunk based port allocation, this mapping can be updated to the external AAA server once for every allocated port-chunk.

NAT functionality can be selectively applied to different data connection (e.g., 5 tuple connections) originating from the mobile subscribers based on the characteristics of the data connection (such as Source-IP address, Source-Port ID, Destination-IP address, Destination-Port ID, and Protocol). Some data connections can be selectively marked for "no NAT" processing based on their characteristics. These characteristics can also include layer 3 or layer 4 characteristics of the data connection. NAT process module 50 inspects both incoming and outgoing IP datagrams of a data connection and, as needed, manages modification of the source IP address and port number in the IP header to reflect the configured NAT address mapping. NAT can support different types of mappings. In one-to-one mapping, each private IP address is mapped to a unique public NAT public IP address. The private source ports do not change. When a private IP address (IP1:port1) is mapped to a public IP address (IP2:port x), any packets from IP1:port x will be sent as though via IP2:port x. The external host can only send packets to IP2:port x, which are translated to IP1:port x.

For many-to-one mapping, when the number of public IP addresses available for an internal network are restricted, multiple private IP addresses are mapped to a single NAT public IP address. To distinguish between different subscribers and different connections originating from same subscriber, internal private source ports are changed to NAT ports. This process is also known as Network Address Port Translation (NAPT). The NAT can allocate more than one NAT public IP address to a private IP address based on the data connection (e.g., configured 5 tuples). Since the NAT can be based on the data connection, a single subscriber can be associated with more than one NAT public IP addresses (e.g., global IP addresses).

Once a data connection is marked to use a NAT public IP address, the same public IP address is used for all packets originating on the flow. The public IP address is released when all data connections associated with it are released. The data connections get released if the mobile subscriber disconnects the call (or the application using the data connection). The data connections can also get released after a configurable idle timer of subscriber inactivity elapses (e.g., no packets are received on the data connection).

When all the ports on the public IP addresses are in use, and a subscriber with a private IP address fails to get a NAT public IP address or a port on the NAT public IP address for a specific packet stream, that specific packet stream will not be NAT processed (e.g., by NAT translator 54) and is dropped.

NAT Realms

A NAT realm is a pool of unique public IP addresses available for translation from private source IP addresses. A NAT realm can be configured by the system to dynamically perform NAT on selected subscribers' IP packets. The system can be configured to perform or not perform NAT based on one or more of the following parameters: destination IP address(es), destination Port Number(s), and layer 4 protocol (TCP/UDP). Other layer 3 and/or 4 parameters such as IP addresses, ports, and protocols can be used.

IP addresses in a NAT realm may be contiguous, and are assignable as a subnet or a range that constitutes less than an entire subnet. IP addresses configured in NAT realms may operate within a single context. A context can be a logical division within the network device that allows the separation of logical entities so network information is not improperly processed. A context can be used for example, in providing a virtual private network or providing multiple PDN gateways on the same network device. In certain embodiments, at any time, a NAT public IP address is configured in one NAT realm inside any one context.

IP addresses can be added to a NAT realm either individually or as a range of IP addresses. In one embodiment, up to 2000 unique NAT IP realms can be configured per context, and a mobile subscriber can be associated with up to three different NAT IP realms. A mobile subscriber can have NATed flows on three different NAT public IP addresses at the same time. NAT public IP addresses from the NAT realms are assigned based on the layer 3/layer 4 characteristics of the data connections from a mobile subscriber. This feature is generally referred as target-based NAT. NAT realms can include a number of configurable parameters, such as:

Users per NAT IP Address: Specifies the maximum number of mobile subscribers sharing one NAT public IP address. In case of one-to-one realms, source IP address translation is performed and port translation is not done. Hence, the internal ports do not change. In case of many-to-one realms, in certain embodiments, since the same NAT IP is used by many subscribers, both IP address and port translations are performed. Hence, the internal ports and IP addresses get translated to NAT ports and NAT public IP addresses. In some embodiments, NAT functionality can first be provided in a one-to-one fashion and as IP addresses are depleted multiple private IP addresses are then assigned to public IP addresses.

Port Chunk Size: Specifies the block size of contiguous ports to be assigned to a N:1 NAT realm subscriber. The port chunk can be set in any size, typically a number divisible by 32, up to a maximum of 32,256 in some embodiments.

Maximum Allowed Chunks per Subscriber: Specifies the amount of port chunks allowed for an individual subscriber from the same NAT public IP address. This parameter can limit subscribers from dominating all the available ports in a N:1 NAT realm.

NAT-Binding-Timer: Specifies the timeout value, in seconds, for NAT resources bound to a data connection. The timer starts counting down when all NATed data connections stop. At the expiration of the binding timer, the NAT resources for that subscriber data connection are released and returned to the NAT pool.

Port Chunk Threshold Value: Specifies threshold in terms of percentage of allocated port chunks against total port chunks available. Once the threshold is reached, new subscribers will not be allocated the same NAT public IP address.

AAA Binding Update Message Required: For some NAT flows, no AAA binding message may be communicated and this option suppresses any AAA messaging when providing NAT functionality.

NAT IP Allocation Mode: Specifies when to allocate a NAT public IP address to a mobile subscriber. NAT-IP association to the subscriber can be done either at call setup or after a data connection is established. NAT public IP address used for the packets originating from a mobile subscriber can be allocated in one of the following modes. In each allocation mode, when the first packet in a data connection comes from the subscriber, the packet undergoes NAT rule matching. Based on the rule matching results, the corresponding NAT realm is selected for NAT IP allocation. This can include two different allocation modes, namely:

Not On-demand Allocation Mode: In this mode, the NAT public IP address is allocated to the subscriber at call setup. If there are three realms configured in a subscriber's rulebase, the subscriber is allocated three NAT public IP addresses, one from each realm.

On-demand Allocation Mode: In this mode, NAT resources are assigned and allocated dynamically based on subscriber flow. The NAT public IP address is allocated to the subscriber during data path (when the data traffic flows in) and not at call setup. In case of on-demand pools, since the IP address is not allocated during call setup, the subscriber may not have a NAT public IP address to be used when the first packet is received. In this case, the IP allocation module checks if there is a free IP address available in the session manager to be allocated to the subscriber. If no such IP is found then the virtual private network manager (VPNMgr) is requested for a free IP address. This may result in packet loss as the VPN may take sometime to respond with a free NAT public IP address. Packets are dropped until a free IP address is found. Once a free IP address is found, it is allocated to the subscriber to be used for subsequent packets or data connections matching the NAT realm.

NAT IP Address Allocation and Deallocation

The minimum number of public IP addresses allocated to each NAT realm can be greater than or equal to the number of Session Managers (SessMgrs) available on the system. In one embodiment, the number is greater than or equal to a number of IP addresses. Where a SessMgr does not communicate with other SessMgrs to know what ports have been allocated, each SessMgr has its own sub-pool of ports to allocate from.

The implementation of the NAT functionality can be endpoint-independent mapping, wherein the NAT functionality reuses the same NAT source port mapping for subsequent packets sent from the same private IP address and port, and with the same protocol to any public destination IP address and port. That is, all packets coming from the mobile subscriber for the current session with the same protocol and same source IP address and source port (X:x) would get the same NAT public IP address and NAT port (X:x) irrespective of the destination IP address and port. NAT does not allow any inbound packets to the NAT public IP address and NAT port (X:x) from an external host IP and host port (Y:y), unless the internal host (MS) had previously sent a packet of the same protocol type to that external IP address and Port (Y:y). However, this behavior changes if NAT application layer gateway (ALG) is enabled. The ALG creates pin holes/dynamic routes in the NAT and allows downlink packets that match the pin holes/dynamic routes towards the internal host (MS) given that there was already a parent connection from MS towards the external host. An advantage of endpoint-independent mapping is that applications are unaffected by NAT translations.

NAT public IP address allocation is based on two factors:

Maximum Users per IP Address: The maximum number of subscribers sharing a given NAT public IP address. Once the number of active subscribers using a given IP address reaches this limit, then the IP address can no longer be allocated to any new subscribers.

Port Chunk Threshold Limit: The threshold is configured in percentage of total number port chunks. If the number of port chunks already allocated from a given NAT public IP address is less than the configured threshold limit of chunks, then the NAT public IP address can be chosen for a new subscriber provided the maximum number of users per NAT public IP address is not reached. But if the number of chunks allocated is greater than or equal to the threshold limit of chunks, then the NAT public IP address would not be chosen for a new subscriber. The remaining free port chunks in the NAT public IP address would be used for the existing subscribers using the NAT public IP address.

Whenever a NAT public IP address is released, the chunks associated with the mobile subscriber are released back to the pool. In some embodiments, there may be some special cases. For example, in not on-demand realms when there is only one chunk associated with the mobile subscriber, the last chunk would not be freed back to the pool even after binding timeout. This chunk can be released along with the NAT public IP address when the call gets disconnected. In case of on-demand realms, when the last flow using the chunk gets cleared, then the binding timer is started. When the binding timeout happens, the chunk together with the IP address are released back to the pool. Thus, the binding timeout of the last chunk is considered as the "address-hold-timeout" for on-demand many to one realm.

NAT Port Chunk Allocation and Deallocation

In some embodiments, NAT ports are allocated to mobile subscribes in chunks (i.e., blocks of ports are set aside for NAT use). As described above, the number of NAT ports in a chunk is configurable and multiple mobile subscribers can use one or more ports in a chunk, depending on the availability of NAT public IP addresses. For example, mobile subscribers sharing a single NAT public IP address (i.e., many-to-one) are allocated NAT ports in chunks. The ports in a given chunk are used by the mobile subscriber to whom the chunk is allocated irrespective of the protocol. When using NAT port chunk, a mobile subscriber can be uniquely identified with a NAT public IP address and a NAT port. This NAT port chunk operation provides a number of benefits such a reduction in mapping signaling, processing, and storage requirements. With the chunk based port allocation, this mapping can be updated to the external authentication, authorization, and accounting server (AAA) once for every allocated port-chunk. As such, whenever a port chunk is allocated, a NAT binding update is sent to the AAA server. Similarly, whenever the port chunk gets deallocated, a binding message is sent. Since port chunk allocation/deallocation happens on a per subscriber session or chunk basis as opposed to per every data connection, the AAA messaging can be reduced.

For a given subscriber, the data traffic can be NATed with the ports chosen in a random fashion from the allocated chunk. When ports in a chunk get exhausted, a new free chunk is requested. The additional chunk allocated to the mobile subscriber would get freed based on binding timeout value. However, in some embodiments, it is ensured that there is at least one chunk allocated to the subscriber as long as there is a NAT public IP address associated with the subscriber. This last chunk is freed only when the NAT public IP address gets deallocated from the subscriber.

The port chunks per NAT public IP address can be maintained in a queue. The chunks are formed using a parameter: "port-chunk-size" (e.g., x). If there are 64,512 ports available for allocation, and if chunk size is x, then the total number of available chunks is 64512/x. The entire port range is divided based on the chunk size. If the total port range is perfectly divisible by the chunk size, then all chunks will be of equal size. If not, then there would be one chunk left with lesser number of ports compared to the other chunks. This chunk is not allocated to any new subscriber as all subscribers should be getting at least one chunk of the configured size. However, it can be allocated on demand to an existing subscriber if the maximum number of chunks allocable is greater than 1. Thus, every subscriber gets at least one chunk per NAT public IP address. The very first chunk gets allocated along with the NAT public IP address for every subscriber.

In case of not-on-demand realms, where the NAT IP allocation happens at call setup, the first chunk would get allocated during call setup itself. In case of on-demand realms, since NAT IP allocation happens in the data path, the first chunk would get allocated in the data path only.

A queue is maintained for free port chunks per NAT IP. Whenever a chunk is requested for, the first chunk in the queue (e.g., least recently used) is chosen for allocation. The parameter "max-chunks-per-user" (e.g., y) basically determines the number of chunks that can be allocated per mobile subscriber. By default, the value of y is 1. In that case, if all ports in the first allocated chunk are exhausted, then the mobile subscriber would not be eligible to get the next chunk, resulting in packet drop. The value y can be configured to be greater than 1 to ensure that the mobile subscriber gets the required number of ports to avoid packet loss.

Port chunk de-allocation happens in case of binding timeout or subscriber session disconnect. An unused port chunk is deallocated from a subscriber only if there is at least one chunk still associated with the subscriber. This ensures that the subscriber is associated with a port chunk if there is a valid NAT public IP address associated to the subscriber.

When all packet flows using ports from a particular port chunk get timed out/cleared, a port chunk becomes completely unused. When the last port of that chunk gets freed, the binding timer (port chunk hold timer) is started. The binding timeout value is configured as part of the NAT realm. Before the binding timer expiry, if any new flows come, then the ports would be allocated from the chunk. As long as there are active flows using the chunk, the chunk cannot be removed. But if no new flows come and the binding timer expires, then the chunk is deallocated, provided there is one chunk still associated with the mobile subscriber. Thus, the additional chunks that were allocated on demand can be deallocated based on the binding timeout. However, the last chunk gets freed only when the NAT public IP address gets deallocated from the mobile subscriber. In some embodiments, de-allocation can be based on the type of realm. For example, with not on-demand realms any additional chunks that were allocated on demand will be de-allocated based on the NAT binding timeout, but the last chunk will not be de-allocated even after the binding timeout. Instead, this chunk is de-allocated when the NAP IP is released from the mobile subscriber. With on-demand realms, the chunks are de-allocated based on the NAT binding timeout including the last chunk. As such, when the last chunk is freed, the NAT public IP address is also released from the subscriber.

When a mobile subscriber disconnects, all port chunks associated with the mobile subscriber are freed. Since the binding timer is maintained per data connection (which can include a call line), as soon as the subscriber disconnects and the data connection gets deallocated, the port chunks get freed even if the binding timeout has not expired. In some embodiments, the chunks would get inserted at the end of the queue. Hence, the probability of a new subscriber getting the same chunk is less, but there is chance that a new subscriber can get this chunk if there are no other chunks available. This situation can result in unsolicited traffic in case of UDP flows as the port chunk gets allocated to a new subscriber even before the binding timeout expired for the previous call that got disconnected. The situation may also result in a TCP connection being terminated by the server. A separate queue can be maintained for chunks that get freed immediately even before timer expiry. A realm based timer can monitors this queue and removes chunks from the second queue (port chunk hold queue) as soon as the timer expires and inserts the chunks into the first queue (free port chunk queue per NAT public IP address).

In certain embodiments, data records, such as NAT binding records, are generated to record certain events. For example, with many-to-one NAT realms, when a port chunk is allocated or de-allocated for a subscriber from a NAT IP these records are generated. It is also possible to configure generation of NAT binding records for other cases. For a one-to-one NAT realm, these records are generated when a NAT IP is allocated or de-allocated for a subscriber based on the configuration as described above. The NAT binding record can include fields such as a correlation ID, the private IP address for a mobile subscriber, accounting fields (e.g., RADIUS/DIAMETER information), the NAT public IP address, the NAT port chunk start, the NAT port chunk end, the NAT binding timer, the number of subscribers per IP address, the NAT realm name, and a port chunk allocation/de-allocation time.

NAT Binding Updates

As described above, implementing NAT includes communication of NAT mappings to an external server. A NAT binding update record includes the mapping between private IP address, public NAT public IP address and the NAT port range along with a few more relevant attributes. The NAT binding update to the AAA server can be sent whenever a new port chunk is assigned to a subscriber or a port chunk is released from the subscriber. The NAT binding record attributes can also be sent in an accounting-interim message to the AAA server. For example, the NAT binding record can be sent as part of accounting interim message when a NAT mapping is released due to inactivity.

The AAA server can also query to get NAT binding mapping from the gateway. This can occur if the same is not available with AAA, or if AAA lost the previously sent update from the gateway. This AAA server query can use a CoA message format and a CoA query response message is used to send the NAT binding updates from the gateway. The AAA server initiated update messaging can use particular attributes to obtain the desired information. For a one-to-one mapping, a NAS IP address and a NAT public IP address can be used. For a many-to-one mapping a NAS IP address, a NAT public IP address, and a NAT port can be used. The gateway can return a CoA-NAK if the query is not properly formatted or does not include the proper information. A successful response message can include the above-described attributes along with the requested information from the gateway. If for a given NAT-IP-Address there are multiple port chunks allocated to the subscriber, then the attributes can be repeated for the number of port-chunks allocated for the mobile subscriber. The attributes can also be repeated in more than one response message when multiple mobile subscribers are associated for a given query of a NAT-IP-address.

The NAT binding record that is sent to an external server can include a number of attributes or fields. The binding record attributes include the mobile subscriber identity, the private IP address associated with the data connection, an accounting delay time offset (to correlate timestamps of records), a NAT public IP address, a NAT port range (including start and end ports of the chunk), and a port chunk allocation/de-allocation flag. The mobile subscriber identity can be one or more of a network access identifier (NAI), an international mobile subscriber identity (IMSI), a temporary mobile subscriber identity (TMSI), or a international mobile equipment identity (IMEI), for example. Other attributes that can be included in the NAT binding record include a timestamp of the last packet transmitted on a given data connection, a timestamp of the first packet transmitted on a given data connection, a NAS IP address, a NAS ID, the protocol being transported in the packets on the data connection, a value of a the port chunk hold timer, and a loading factor value that indicates how widely a realm is being shared in a many-to-one realm.

A correlation ID attribute can also be included. The correlation ID can depend on the type of call (e.g., simple IP (SIP), mobile IP (MIP), proxy mobile IP (PMIP), etc.). In some embodiments, the correlation ID is the 3GPP2-correlation-ID and can be used for identifying mobile subscriber sessions in certain types of accounting. For SIP calls, a PDSN-Correlation-ID refers to 3GPP2-Correlation-ID can be used with the correlation ID generated at PDSN. For MIP calls, a HA-Correlation-ID can be used with to 3GPP2-Correlation-ID generated at home agent (HA). And for MIP calls the PDSN-Correlation-ID send to HA from PDSN is the 3GPP2-Correlation-ID generated at PDSN and called a FA-Correlation-ID.

The message used to transmit NAT binding records from a gateway to an external server, such as an AAA server, can be vendor specific attribute (VSA) formatted message. This VSA message can be used for reporting interim accounting information relating to NAT mappings. FIG. 3A illustrates a header of a VSA formatted message in accordance with certain embodiments. The VSA header can include a code to indicate it is an accounting message, an identifier, a length, and authenticator information. Attributes can then be appended to the end of the VSA header. FIG. 3B illustrates vendor specific messages attributes for a binding record message in accordance with certain embodiments. As shown, the attributes described above can be carried in this message. For example, a number of NAT specific attributes are shown in FIG. 3B, such as the NAT public IP address, the NAT port block start, the NAT port block end, the allocation/deallocation flag, the correlation ID, the loading factor, the binding timer, and the binding timer. In some embodiments, this NAT message includes a single NAT binding update and separate interim messages are sent for each realm or port chunk. However, in alternative embodiments, multiple port chunks can be included in a NAT binding update message.

How NAT Works

The session manager can be used to setup the NAT functionality. The session manager checks for policies in the subscriber profile received from the AAA Manager. The polices are used to determine if active charging service (ACS), firewall policy, and NAT policy are enabled in the rulebase, and that rulebase is valid. In some embodiments, if they are enabled, once a private IP address is allocated to the mobile subscriber, the NAT realm to be used for the subscriber is determined in the not-on-demand allocation mode. At least one valid NAT realm is configured in the rulebase, and that realm is configured in the context. The private IP addresses assigned to subscribers are from certain defined ranges to aid translation.

In this embodiment, a maximum of three NAT realms can be configured in a rulebase. A subscriber can be allocated only one NAT public IP address per NAT realm. Hence, at any point, there can be a maximum of three NAT public IP addresses allocated to a subscriber.

NAT setup for a packet flow is based on the NAT mapping configured for the subscriber. In case of one-to-one NAT mapping, the subscriber IP address is mapped to a public IP address. The private source ports do not change. The SessMgr installs a flow in the NPU using the NAT public IP address and fixed port range (1-65535). In case of many-to-one NAT mapping, a NAT public IP address, and a port, from a port chunk, is allocated for each data connection originating from the mobile subscriber. In order to identify a particular subscriber data connection or call line, the SessMgr installs a flow using NAT public IP address and NAT ports allocated for the subscriber. In case of many-to-many NAT mapping, where subscriber IP address is mapped to a NAT public IP address the private source ports do not change, and the SessMgr installs a flow using the NAT public IP address and fixed port range (1-65535).

The number of NAT ports to be allocated for each subscriber depends on the number of maximum associations allowed per subscriber. The number of NAT ports per subscriber can be lesser than or equal to any multiple of the number of max associations per subscriber. The number of associations per context/VPN and per subscriber is configurable.

FIGS. 4A-4D illustrate operation of NAT processing in accordance with certain embodiments. Data packets 200 are received by NAT process on the gateway in 200. In 202, whether the packet is an uplink packet is determined. If the packet is an uplink packet, then NAT process checks if enhanced charging service (ECS) is enabled for the subscriber in 204. If ECS is enabled in 204, then the packet is sent to 224 for ECS processing. If ECS is not enabled, then the packet is sent the packet along to the Internet in 206. If the packet is a downlink packet in 202, then in 208 a determination is made whether NAT is enabled on the gateway. If NAT is not enabled, then the gateway checks if ECS is enabled for the subscriber in 210. If ECS is enabled, then the data packet is sent along to the ECS module for processing in 224. If ECS is not enabled, then the data packet is sent along to the user equipment (UE) or mobile subscriber (MS) in 212.

If NAT is enabled, the NAT process module checks if a binding exists in 214. If the NAT process module fails to find a binding, then it updates statistics on the gateway and drops the packet in 216. If the NAT process module finds the binding, then downlink NAT processing is begun in 218 on the NAT process module because the binding includes the mapping and other information. The NAT processing can include any of the processes mentioned above. In 220, if NAT processing is not successful, then the statistics are updated and the packet is dropped in 222. If the NAT processing is determined to be successful in 220, the data packet is sent to the ECS for processing in 224. In 228, an analyzer module determines whether the packet is fragmented. If the packet is fragmented, it is buffered in 230 to collect the fragments for reassembly in 232. If the reassembly fails, then in 234 the packet is dropped and the statistics are updated. If the packet is not fragmented in 228, then the analyzer module performs an IP header check on the data packet in 236. This IP header check can include comparing fields in the packet against ruledefs in the analyzer module to determine how to handle the data packet in the gateway. If the data packet fails the IP header inspection of 236, then the packet is dropped and the statistics and denial of service (DoS) attacks are updated in 238.

If the data packet passes the IP header check in 236, then the analyzer module determines if a matching flow exists for the packet in 240. A matching flow includes a filter or packet director that is setup in the NPU of the gateway to direct the data packet when received by the gateway. If a matching flow exists in 240, then in 242 the flow statistics are updated and transport layer header and state checks are performed in 244. If the data packet fails the header and state checks of 244, then the packet is dropped and the statistics are updated in 246. If the data packet passes the transport layer header and state checks, then the data packet is passed along to the active charging service (ACS) module for further processing in 306, and NAT translation is performed in 308.

If the analyzer module determines that no matching flow exists for the data packet, then transport layer header and state checks are performed in 248. If the packet fails the checks of 248, then in 250 the statistics and DoS attacks are updated and the packet is dropped. If the packet passes the checks of 248, then the analyzer module determines if the flow limit per subscriber is reached in 252. If the limit has been reached in 252, then the statistics are updated and the packet is dropped in 254. If the limit has not been reached in 252, then the analyzer module determines if the max allowed memory limits of the active charging service (ACS) have been reached in 256. If the memory limits have been reached in 256, then the statistics are updated to include this event and the packet is dropped in 258.

If the memory limits have not been reached in 256, then the analyzer module determines if the maximum number of flows per session manager module have been reached in 260. If the maximum number of flows has been reached in 260, then the statistics are updated and the packet is dropped in 262. If the max number of flows has not been reached in 260, then the analyzer performs a firewall rule match in 264. If the firewall rules deny the packet, then the statistics are updated and the packet is dropped. If the packet passes the firewall in 264, then in 270 the analyzer module determines if NAT has to be applied. This NAT determination in 270 is applied to catch uplink packets that bypassed NAT processing in 218 to first go through ECS processing. If NAT processing has already occurred in the NAT process module, then the data packet is sent to ACS for further processing in 306, and NAT translation occurs in 308.

If the packet is an uplink packet and NAT has to be applied in 270, then the NAT process module checks if the IP address is available in 272. If the IP address is not available in 274, then the NAT process module checks if buffering is enabled in 274. If the packet can be buffered until the IP address is available, then the packet is buffered in 276 and an IP allocation request is made in 278 through a virtual private network (VPN) module 280. At 284, an IP allocation response is made by the VPN module. If the IP allocation response fails, then the packet is dropped and the statistics are updated in 286. If the IP allocation response is successful, then in 292 the buffered packets are processed to receive an IP allocation and undergo uplink NAT processing in 294. The buffered packet processing of 292 can include allocation of a chunk of ports and mapping processing as described above. The NAT processing in 294 can include preparing the packet for NAT translation in 308.

If an IP address is available in 272, then the NAT process module in 288 checks the port availability and mapping table. If an error occurs in the mapping table lookup, an error exception is thrown in 290 and the packet is dropped and the statistics log is updated. After successfully performing a port availability check and mapping lookup in 288, uplink NAT processing is performed in 294. After uplink NAT processing in 294, the NAT process module check is the NAT processing was successful in 296. If the NAT processing was not successful, then the NAT process module updates the statistics and drops the packet in 298.

If the NAT processing was successful in 296, then the NAT process module detects whether packet flooding is occurring in 300. Packet flooding is a type of Denial of Service (DoS) attack on the network, and if it is detected the packets can be dropped in 302 and the statistics updated to record the packets causing the flooding. If flooding is not detected in 304, then a firewall flow can be created if one is not already, an existing flow can be updated, and/or the packet statistics can be updated. The packet is then sent to the active charging service (ACS) module to process for charging purposes in 306. In 308, the packet is sent to a NAT translation module that performs the replacement of information in the header of the packet to translate between a private IP address to a public IP address and vice-versa. The NAT translation can also involve other modifications to the packet in some embodiments. As described above, the NAT translation module and the NAT process module can be the same module in some embodiments.

Communication Network

Figure 5:
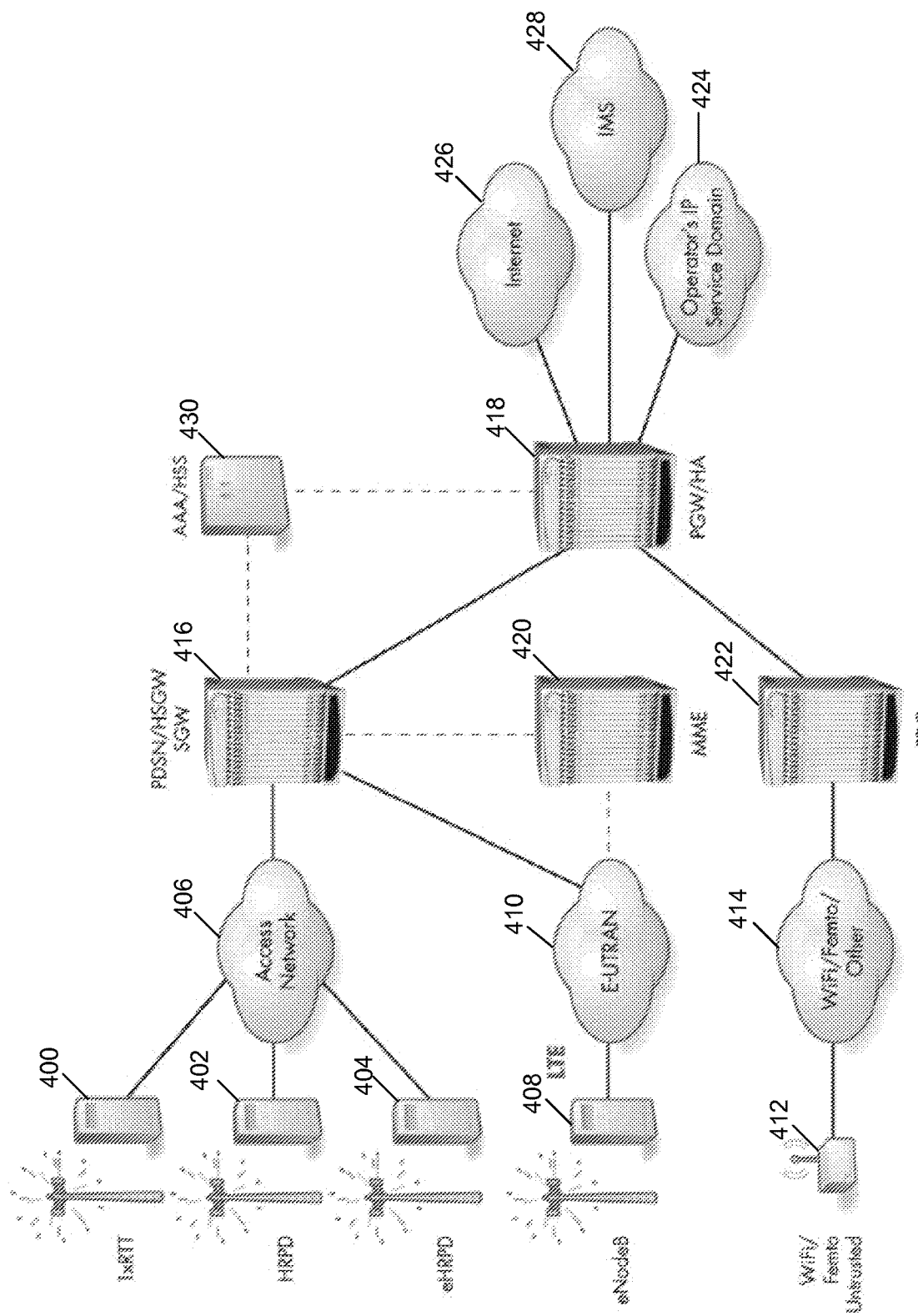
FIGS. 5-6 illustrate various communication networks that employ NAT functionality in accordance with some embodiments.

FIG. 5 illustrates a communication network that includes a gateway with NAT functionality in accordance with certain embodiments. FIG. 4 includes a number of radio access technologies such as a 1xRTT transceiver 400, a high-rate packet data (HRPD) transceiver 402, and an evolved high-rate packet data (eHRPD) transceiver 404, each of which can connect to an access network 406. An evolved Node B (eNodeB) transceiver 408 is an LTE network radio network component that connects to an Evolved UMTS Terrestrial Radio Access Network (E-UTRAN) 410. Other radio access technologies such as WiFi, Femto, WiMAX, or any other radio spectrum technology can use transceiver 412 to connect to the network using a broadband or other access network.

The access network 406 can communicate with an access gateway 416 that implements a combination of functionalities such as a packet data serving node (PDSN), a HRPD serving gateway (HSGW), and a serving gateway (SGW). In operation, the PDSN functionality can be used with 1xRTT 400, the HSGW functionality can be used with HRPD 402 and eHRPD 404, and the SGW functionality can be used with the eNodeB 408. The access gateway 416 can communicate with an anchor gateway 418, which can implement a packet data network gateway (PGW) and a Home Agent (HA) and a mobility management entity (MME) 420. On the access network side, the anchor gateway 418 can also communicate with an evolved packet data gateway (ePDG) 422 which provides connectivity to the WiFi/Femto/other transceiver 412. On the packet core side, the anchor gateway can communicate with the operator's IP service domain 424, the internet 426, and IP multimedia subsystem (IMS) 428. An authentication, authorization, and accounting (AAA) server/home subscriber server (HSS) 430 can communicate with the access gateway 416, the anchor gateway 418, or both.

The Home Subscriber Server (HSS) 430 can be a master user database that supports IMS network entities that handle calls. The HSS 430 stores subscription-related information (subscriber profiles), performs authentication and authorization of the user, and can provide information about the subscriber's location and IP information. The AAA server 430 can provide authentication, access control, and accounting to the network. The authentication can involve verification of the subscriber, the access control can involve granting or denying access to specific services, and the accounting that can take place is the tracking of the use of network resources by subscribers. Other servers, such as the Home Location Register (HLR) can be used in other embodiments. In certain embodiments, the AAA/HSS 430 can communicate with the access gateway 416 for charging purposes.

The LTE communication network includes a PDN gateway (PGW) 418, a serving gateway (SGW) 416, an E-UTRAN (evolved-UMTS terrestrial radio access network) 410, and a mobility management entity (MME) 420. The evolved packet core (EPC) of an LTE communications network includes the MME 420, SGW 416 and PGW 418 components. In some embodiments, one or more EPC components can be implemented on the same gateway or network device as described below.

The SGW sits in the user plane where it forwards and routes packets to and from the eNodeB and PGW. The SGW also serves as the local mobility anchor for inter-eNodeB handover and mobility between 3GPP networks. The SGW routes and forwards user data packets, while also acting as the mobility anchor for the user plane during inter-eNB handovers and as the anchor for mobility between LTE and other 3GPP technologies (terminating S4 interface and relaying the traffic between 2G/3G systems and PGW). For idle state UEs, the SGW terminates the down link data path and triggers paging when down link data arrives for the UE. The SGW manages and stores UE contexts, e.g. parameters of the IP bearer service and network internal routing information. The SGW also performs replication of the user traffic in case of lawful interception.

The PGW acts as the interface between the LTE network and other packet data networks, such as the Internet or SIP-based IMS networks (fixed and mobile). The PGW serves as the anchor point for intra-3GPP network mobility, as well as mobility between 3GPP and non-3GPP networks. The PGW acts as the Policy and Charging Enforcement Function (PCEF), which manages Quality of Service (QoS), online/offline flow-based charging data generation, deep-packet inspection, and lawful intercept. The PGW provides connectivity to the UE to external packet data networks by being the point of exit and entry of traffic for the UE. A UE may have simultaneous connectivity with more than one PGW for accessing multiple packet data networks. The PGW performs policy enforcement, packet filtering for each user, charging support, lawful interception, and packet screening. The PGW also provides an anchor for mobility between 3GPP and non-3GPP technologies such as WiMAX and 3GPP2 standards (CDMA 1X and EVDO).

The MME resides in the EPC control plane and manages session states, authentication, paging, mobility with 3GPP 2G/3G nodes, roaming, and other bearer management functions. The MME can be a standalone element or integrated with other EPC elements, including the SGW, PGW, and Release 8 Serving GPRS Support Node (SGSN). The MME can also be integrated with 2G/3G elements, such as the SGSN and GGSN. This integration is the key to mobility and session management interworking between 2G/3G and 4G mobile networks.

MME 420 is a control-node for the LTE access network. The MME is responsible for UE tracking and paging procedures including retransmissions. MME 420 handles the bearer activation/deactivation process and is also responsible for choosing the SGW for a UE at the initial attach and at time of an intra-LTE handover. The MME also authenticates the user by interacting with the HSS 430. The MME also generates and allocates temporary identities to UEs and terminates Non-Access Stratum (NAS) signaling. The MME checks the authorization of the UE to camp on the service provider's Public Land Mobile Network (PLMN) and enforces UE roaming restrictions. The MME is the termination point in the network for ciphering/integrity protection for NAS signaling and handles the security key management. Lawful interception of signaling is also supported by the MME. The MME also provides the control plane function for mobility between LTE and 2G/3G access networks with the S3 interface terminating at the MME from the SGSN (not shown). The MME also terminates the S6a interface towards the home HSS for roaming UEs.

The ePDG 422 is responsible for interworking between the EPC and fixed non-3GPP access technologies such as a WiFi, WiMAX, LTE metro, and femtocell access networks. The ePDG 422 can use IPSec/IKEv2 to provide secure access to the EPC network. Optionally, the ePDG can use Proxy Mobile IPv6 (PMIPv6) to interact with the PGW when the mobile subscriber is roaming in an untrusted non-3GPP system. The ePDG is involved in tunnel authentication and authorization, transport level packet marking in the uplink, policy enforcement of Quality of Service (QoS) based on information received via Authorization, Authentication, Accounting (AAA) infrastructure, lawful interception, and other functions.

Figure 6:
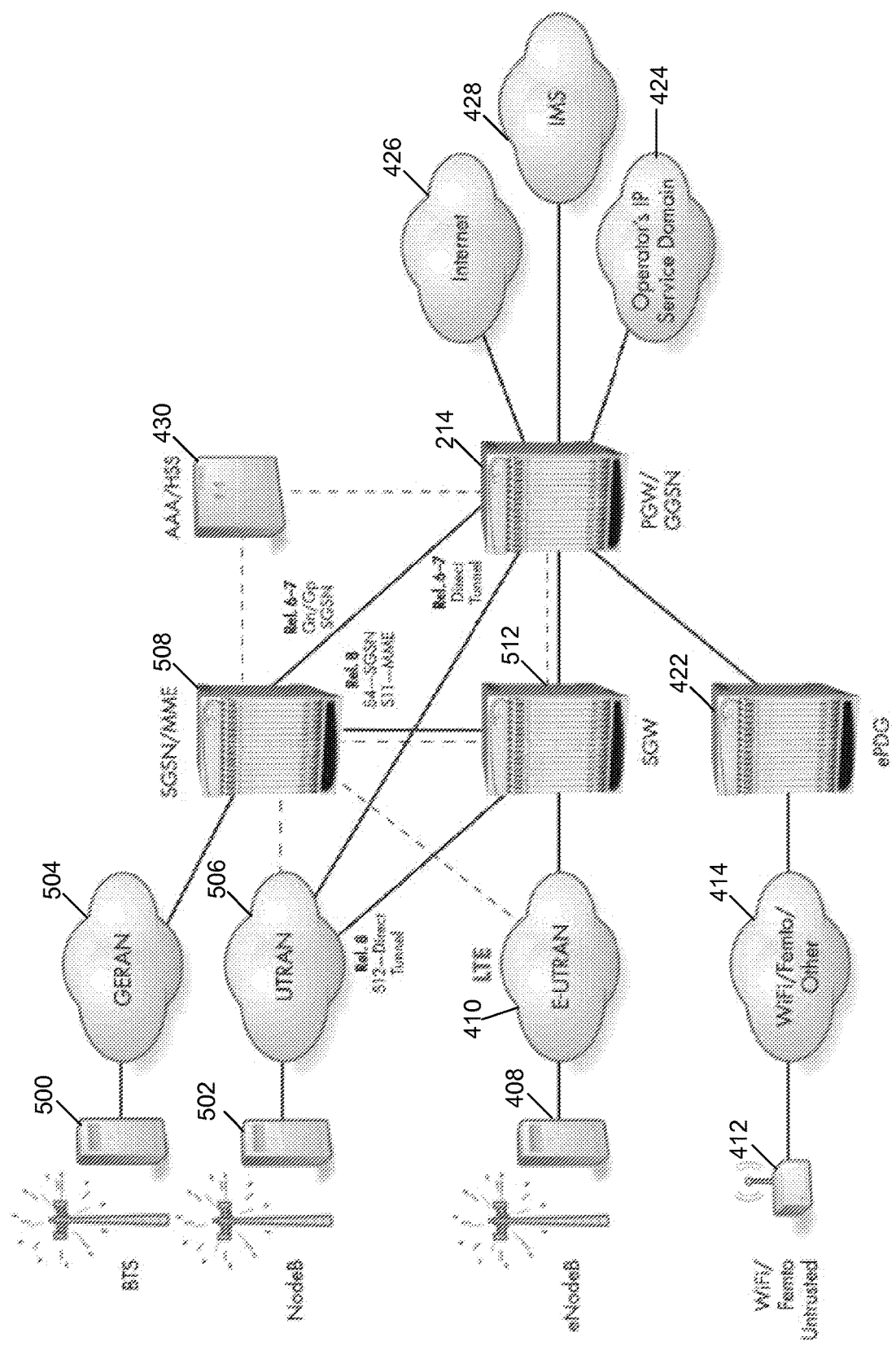

FIG. 6 illustrates a communication network that implements a gateway with NAT functionality with legacy universal mobile telecommunications systems (UMTS) network devices in accordance with certain embodiments. The legacy transceivers include base transceiver station (BTS) 500 and NodeB transceiver 502. The BTS 500 can communicate with a GSM EDGE Radio Access Network (GERAN) 504 and the NodeB 502 can communicate with a UMTS terrestrial radio access network (UTRAN) 506. The serving GPRS support node (SGSN) can be implemented on a gateway 508 with a mobility management entity (MME). The GERAN 504 can communicate through the SGSN functionality on gateway 508 to serving gateway (SGW) 512 or gateway GPRS support node (GGSN)/PGW 514.

In some embodiments, the NAT functionality can be implemented on a gateway, such as PDSN/HSGW/SGW 416, SGSN/MME 508, PGW/GGSN 414, or PGW/HA 418. The gateway can access and maintain information relating to the communication session, the subscriber, the radio bearers, and the policies relating to the communication session. The gateway may be used to provide various services to a mobile device and implement the quality of service (QoS) on packet flows. Several of these functions are used in providing, for example, voice over IP (VoIP) routing and enhanced services, such as enhanced charging, stateful firewalls, traffic performance optimization (TPO). The communication networks also allow provision of applications such as VoIP, streaming video, streaming music, multi-user gaming, location based services, and a variety of content delivered to a mobile node. Residing within the gateway can be one or more processing units and memories for providing modules and functionalities.

General Gateway Implementations

The mobile subscriber or user equipment described above can communicate with a plurality of radio access networks using a plurality of access technologies and with wired communication networks. The mobile subscriber can be a smartphone offering advanced capabilities such as word processing, web browsing, gaming, e-book capabilities, an operating system, and a full keyboard. The user equipment may run an operating system such as Symbian OS, iPhone OS, RIM's Blackberry, Windows Mobile, Linux, Palm WebOS, and Android. The screen may be a touch screen that can be used to input data to the mobile device and the screen can be used instead of the full keyboard. The mobile subscriber may have the capability to run applications or communicate with applications that are provided by servers in the communication network. The user equipment can receive updates and other information from these applications on the network.

The mobile subscriber also encompasses many other devices such as televisions (TVs), video projectors, set-top boxes or set-top units, digital video recorders (DVR), computers, netbooks, laptops, and any other audio/visual equipment that can communicate with a network. The user equipment can also keep global positioning coordinates, profile information, or other location information in its stack or memory. The user equipment can have a memory such as a computer readable medium, flash memory, a magnetic disk drive, an optical drive, a programmable read-only memory (PROM), and/or a read-only memory (ROM). The mobile subscriber can be configured with one or more processors that process instructions and run software that may be stored in memory. The processor can also communicate with the memory and interfaces to communicate with other devices. The processor can be any applicable processor such as a system-on-a-chip that combines a CPU, an application processor, and flash memory. The interfaces can be implemented in hardware or software. The interfaces can be used to receive both data and control information from the network as well as local sources, such as a remote control to a television. The user equipment can also provide a variety of user interfaces such as a keyboard, a touch screen, a trackball, a touch pad, and/or a mouse. The user equipment may also include speakers and a display device in some embodiments.

The gateway described above is implemented in a network device in some embodiments. This network device can implement multiple and different integrated functionalities. In some embodiments, one or more of the following functionalities can be implemented on the network device including a security gateway (SeGW), an access gateway, a Gateway General packet radio service Serving Node (GGSN), a serving GPRS support node (SGSN), a packet data inter-working function (PDIF), an access service network gateway (ASNGW), a User Plane Entity (UPE), an IP Gateway, a session initiation protocol (SIP) server, a proxy-call session control function (P-CSCF), and an interrogating-call session control function (I-CSCF), a serving gateway (SGW), and a packet data network gateway (PDN GW), a mobility management entity (MME), a packet data serving node (PDSN), a foreign agent (FA), and/or home agent (HA). In certain embodiments, the functionalities are provided by a combination of hardware and software in the network device. General purpose hardware can be configured in the network device to provide one or more of these specialized functionalities.

The gateway can also support sessions originated from a Femto base station, which would connect to the gateway using a broadband network. A person or corporation may use a Femto base station in a home or business to support one or more mobile nodes. The gateway can provide trigger based traffic management during a handoff from a Femto base station to a macro base station, while maintain traffic management for the mobile node.

Figure 7:
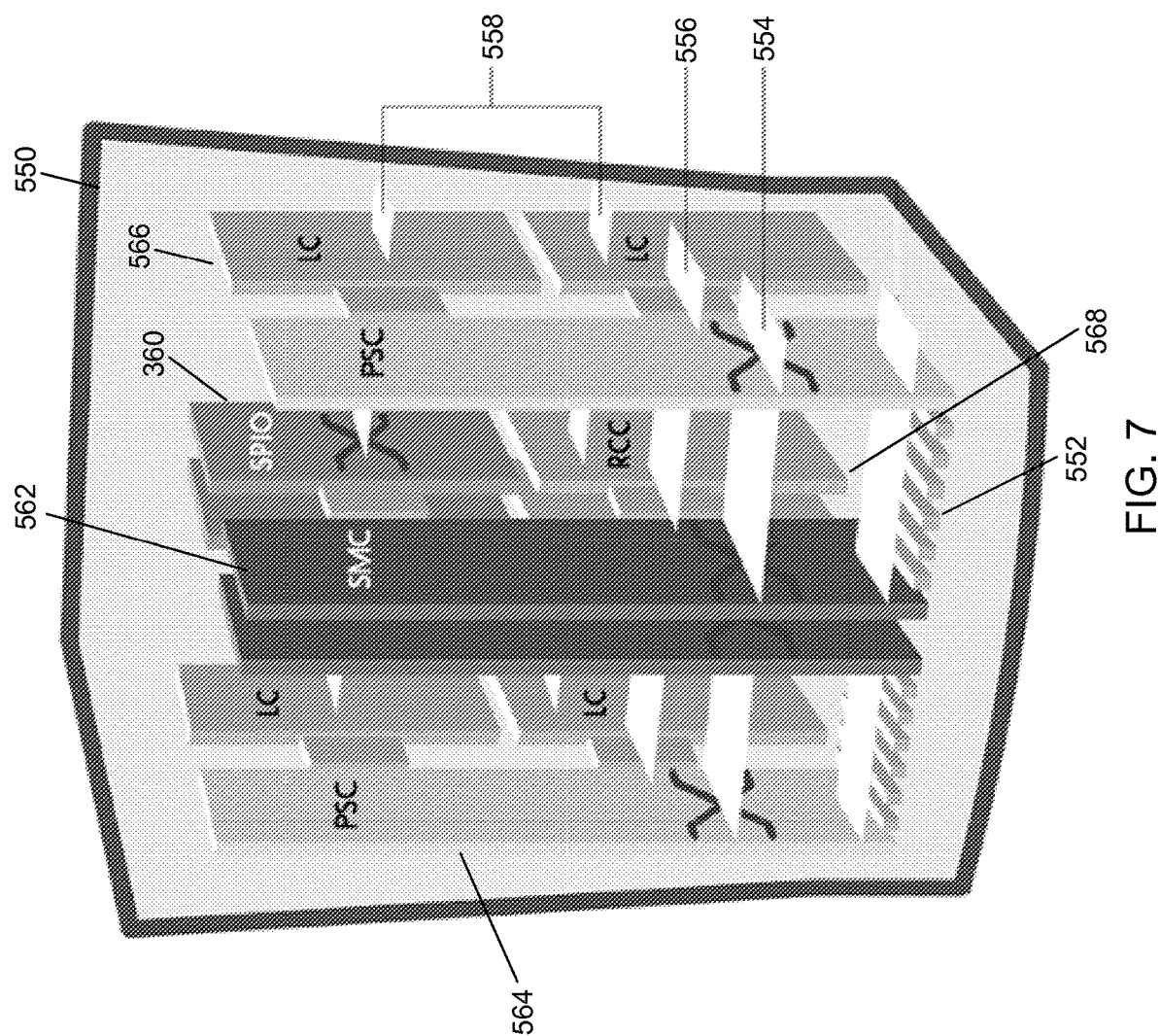
FIG. 7 illustrates a network device configuration in accordance with certain embodiments.

In some embodiments the network device is implemented using a collection of integrated circuit boards or cards. These cards include input/output interfaces for communication amongst each other, at least one processor for executing instructions and running modules that are stored in memory, and memory for storing data. The features of a network device that implements a gateway, in accordance with some embodiments, are further described below. FIG. 7 illustrates the implementation of a network device in accordance with some embodiments. The network device 550 includes slots 552 for loading application cards and line cards. A midplane can be used in the network device to provide intra-network device communications, power connections, and transport paths between the various installed cards. The midplane can include buses such as a switch fabric 554, a control bus 556, a system management bus, a redundancy bus 558, and a time division multiplex (TDM) bus. The switch fabric 554 is an IP-based transport path for user data throughout the network device implemented by establishing inter-card communications between application cards and line cards. The control bus 556 interconnects the control and management processors within the network device. The network device management bus provides management of system functions such as supplying power, monitoring temperatures, board status, data path errors, card resets, and other failover features. The redundancy bus 558 provides transportation of user data and redundancy links in the event of hardware failures. The TDM bus provides support for voice services on the system.

The network device supports at least four types of application cards: a switch processor I/O card (SPIO) 560, a system management card (SMC) 562, a packet service card (PSC) 564, and a packet accelerator card (not shown). Other cards used in the network device include line cards 366 and redundant crossbar cards (RCC) 568. The line cards 566, when loaded in the network device, provide input/output connectivity to the network and other devices, as well as redundancy connections. The line cards 566 include interfaces to the network through Ethernet, Fiber Optic, and the other communication mediums. The redundant crossbar card (RCC) 568 includes a non-blocking crossbar and connections to each of the cards in the network device. This allows a redundant connection to be made through the redundant crossbar card 568 from any one card to any other card in the network device. The SPIO card 560 serves as a controller of the network device and is responsible for such things as initializing the network device and loading software configurations onto other cards in the network device.

The system management card (SMC) 562 and switch processor card (not shown) are system control and management cards for managing and controlling other cards in the network device. The packet accelerator card (PAC) and packet service card (PSC) 564 provide packet processing, context processing capabilities, and forwarding capabilities among other things. The PAC and PSC 564 perform packet-processing operations through the use of control processors and a network processing unit. The network processing unit determines packet processing requirements; receives and transmits user data frames to/from various physical interfaces; makes IP forwarding decisions; implements packet filtering, flow insertion, deletion, and modification; performs traffic management and traffic engineering; modifies/adds/strips packet headers; and manages line card ports and internal packet transportation. The control processors, also located on the packet accelerator card, provide packet-based user service processing.

The operating system software can be based on a Linux software kernel and run specific applications in the network device such as monitoring tasks and providing protocol stacks. The software allows network device resources to be allocated separately for control and data paths. For example, certain packet accelerator cards and packet services cards can be dedicated to performing routing or security control functions, while other packet accelerator cards/packet services cards are dedicated to processing user session traffic. As network requirements change, hardware resources can be dynamically deployed to meet the requirements in some embodiments. The system can be virtualized to support multiple logical instances of services, such as technology functions (e.g., a SeGW PGW, SGW, MME, HSGW, PDSN, ASNGW, PDIF, HA, or GGSN).

The network device's software can be divided into a series of tasks that perform specific functions. These tasks communicate with each other as needed to share control and data information throughout the network device. A task is a software process that performs a specific function related to system control or session processing. Three types of tasks operate within the network device in some embodiments: critical tasks, controller tasks, and manager tasks. The critical tasks control functions that relate to the network device's ability to process calls such as network device initialization, error detection, and recovery tasks. The controller tasks mask the distributed nature of the software from the user and perform tasks such as monitor the state of subordinate manager(s), provide for intra-manager communication within the same subsystem, and enable inter-subsystem communication by communicating with controller(s) belonging to other subsystems. The manager tasks can control system resources and maintain logical mappings between system resources.

Individual tasks that run on processors in the application cards can be divided into subsystems. A subsystem is a software element that either performs a specific task or is a culmination of multiple other tasks. A single subsystem can include critical tasks, controller tasks, and manager tasks. Some of the subsystems that can run on a network device include a system initiation task subsystem, a high availability task subsystem, a recovery control task subsystem, a shared configuration task subsystem, a resource management subsystem, a virtual private network subsystem, a network processing unit subsystem, a card/slot/port subsystem, and a session subsystem.

The system initiation task subsystem is responsible for starting a set of initial tasks at system startup and providing individual tasks as needed. The high availability task subsystem works in conjunction with the recovery control task subsystem to maintain the operational state of the network device by monitoring the various software and hardware components of the network device. Recovery control task subsystem is responsible for executing a recovery action for failures that occur in the network device and receives recovery actions from the high availability task subsystem. Processing tasks are distributed into multiple instances running in parallel so if an unrecoverable software fault occurs, the entire processing capabilities for that task are not lost. User session processes can be sub-grouped into collections of sessions so that if a problem is encountered in one sub-group users in another sub-group will not be affected by that problem.

The architecture also allows check-pointing of processes, which is a mechanism to protect the system against any critical software processes that may fail. The self-healing attributes of the software architecture protects the system by anticipating failures and instantly spawning mirror processes locally or across card boundaries to continue the operation with little or no disruption of service. This unique architecture allows the system to perform at the highest level of resiliency and protects the user's data sessions while ensuring complete accounting data integrity.

Shared configuration task subsystem provides the network device with an ability to set, retrieve, and receive notification of network device configuration parameter changes and is responsible for storing configuration data for the applications running within the network device. A resource management subsystem is responsible for assigning resources (e.g., processor and memory capabilities) to tasks and for monitoring the task's use of the resources.

Virtual private network (VPN) subsystem manages the administrative and operational aspects of VPN-related entities in the network device, which include creating separate VPN contexts, starting IP services within a VPN context, managing IP pools and subscriber IP addresses, and distributing the IP flow information within a VPN context. In some embodiments, within the network device, IP operations are done within specific VPN contexts. The network processing unit subsystem is responsible for many of the functions listed above for the network processing unit. The card/slot/port subsystem is responsible for coordinating the events that occur relating to card activity such as discovery and configuration of ports on newly inserted cards and determining how line cards map to application cards.

The session subsystem is responsible for processing and monitoring a mobile subscriber's data flows in some embodiments. Session processing tasks for mobile data communications include: S1/S5/S8 interface termination for LTE networks, A10/A11 interface termination for CDMA networks, GSM tunneling protocol (GTP) termination for GPRS and/or UMTS networks, asynchronous PPP processing, IPsec, packet filtering, packet scheduling, Diffserv codepoint marking, statistics gathering, IP forwarding, and AAA services, for example. Responsibility for each of these items can be distributed across subordinate tasks (called managers) to provide for more efficient processing and greater redundancy. A separate session controller task serves as an integrated control node to regulate and monitor the managers and to communicate with the other active subsystem. The session subsystem also manages specialized user data processing such as payload transformation, filtering, statistics collection, policing, and scheduling.

Figure 8:
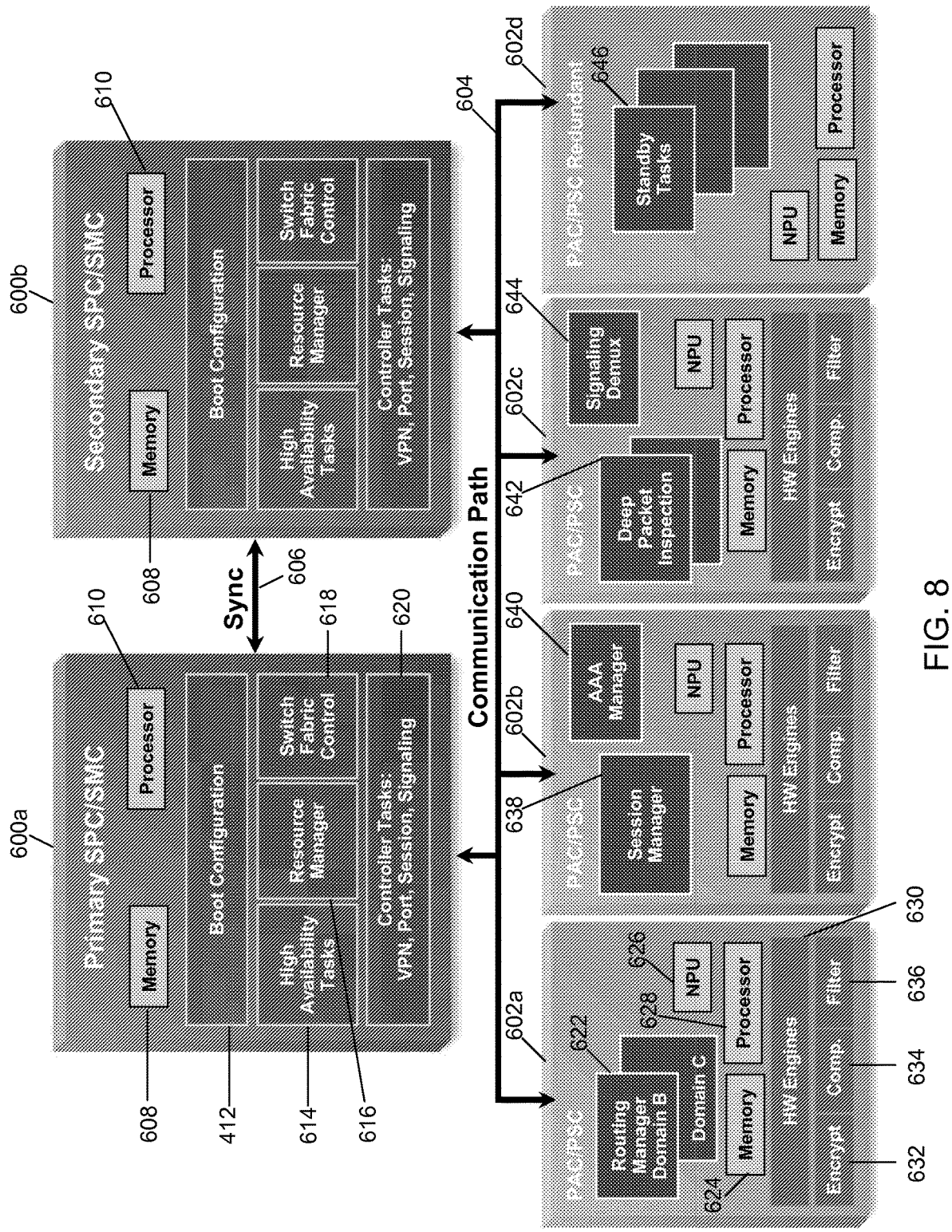
FIG. 8 illustrates an architecture of a network device in accordance with certain embodiments.

The network device allows system resources to be allocated separately for control and data paths. For example, certain PACs/PSCs could be dedicated to performing routing or security control functions while other PACs/PSCs are dedicated to processing user session traffic. As network requirements grow and call models change, hardware resources can be added to accommodate processes, such as encryption, packet filtering, etc., that require more processing power. FIG. 8 illustrates a logical view of the software architecture of a network device in accordance with certain embodiments. As shown, the software and hardware can be distributed within the network device and across different circuit boards, processors, and memory. FIG. 8 includes a primary switch processor card (SPC)/system management card (SMC) 600a, a secondary SPC/SMC 600b, PAC/PSC 602a-602d, a communication path 604, and a synchronization path 606. The SPC/SMC 600 include a memory 608, a processor 610, a boot configuration 612, high availability tasks 614, resource manager 616, switch fabric control 618, and controller tasks 620.

The SPC/SMC 600 manage and control the network device including the other cards in the network device. The SPC/SMC 600 can be configured in a primary and secondary arrangement that provides redundancy and failsafe protection. The modules or tasks running on the SPC/SMC 600 are related to network device wide control and management. The boot configuration task 612 includes information for starting up and testing the network device. The network device can also be configured to startup in different configurations and providing different implementations. These can include which functionalities and services are capable of running on the SPC/SMC 600. The high availability task 614 maintains the operational state of the network device by monitoring the device and managing recovery efforts to avoid disruption of service. The resource manager tracks and assigns the available resources for sessions and demands on the network device. This can include load balancing among different processors and tasks running on the network device. Processes can be distributed across the system to fit the needs of the network model and specific process requirements. For example, most tasks can be configured to execute on SPC/SMC 600 or a PAC/PSC 602, while some processor intensive tasks can also be performed across multiple PACs/PSCs to utilize multiple CPU resources. Distribution of these tasks is invisible to the user. The switch fabric control 618 controls the communication paths in the network device. The controller tasks module 620 can manage the tasks among the resources of the networks to provide, for example, VPN services, assign ports, and create, delete, and modify sessions for user equipment.

The PAC/PSC 602 are high-speed processing cards that are designed for packet processing and the tasks involved with providing various network functionalities on the network device. The PAC/PSC 602 include a memory 624, a network processing unit (NPU) 626, a processor 628, a hardware engine 630, an encryption component 632, a compression component 634, and a filter component 636. Hardware engines 630 can be deployed with the card to support parallel distributed processing for compression, classification traffic scheduling, forwarding, packet filtering, and statistics compilations. The components can provide specialize processing that can be done more efficiently than using a general processor in some embodiments.

Each PAC/PSC 602 is capable of supporting multiple contexts. The PAC/PSC 602 are also capable of running a variety of tasks or modules. PAC/PSC 602a provides routing managers 622 with each covering routing of a different domain. PAC/PSC 602b provides a session manager 638 and an AAA manager 640. The session manager 638 manages one or more sessions that correspond to one or more user equipment. A session allows a user equipment to communicate with the network for voice calls and data. The AAA manager 640 manages accounting, authentication, and authorization with an AAA server in the network. PAC/PSC 602 provides a deep packet inspection task 642 and a signaling demux 644. The deep packet inspection task 642 provides inspection of packet information beyond layer 4 for use and analysis by the network device. The signaling demux 644 can provide scalability of services in combination with other modules. PAC/PSC 602*d* provides redundancy through standby tasks 646. Standby tasks 646 store state information and other task information so that the standby task can immediately replace an active task if a card fails or if there is a scheduled event to remove a card.

In some embodiments, the software needed for implementing a process or a database includes a high level procedural or an object-orientated language such as C, C++, C#, Java, or Perl. The software may also be implemented in assembly language if desired. Packet processing implemented in a network device can include any processing determined by the context. For example, packet processing may involve high-level data link control (HDLC) framing, header compression, and/or encryption. In certain embodiments, the software is stored on a storage medium or device such as read-only memory (ROM), programmable-read-only memory (PROM), electrically erasable programmable-read-only memory (EEPROM), flash memory, or a magnetic disk that is readable by a general or special purpose-processing unit to perform the processes described in this document. The processors can include any microprocessor (single or multiple core), system on chip (SoC), microcontroller, digital signal processor (DSP), graphics processing unit (GPU), or any other integrated circuit capable of processing instructions such as an x86 microprocessor.

Although the present disclosure has been described and illustrated in the foregoing example embodiments, it is understood that the present disclosure has been made only by way of example, and that numerous changes in the details of implementation of the disclosure may be made without departing from the spirit and scope of the disclosure, which is limited only by the claims which follow.

We claim:

1. An apparatus comprising:
   a memory;
   one or more processors configured to:
   in response to identifying a first data connection associated with a first user device:
   allocate a public Internet Protocol (IP) address for the first user device;
   allocate a first plurality of network address translation (NAT) ports of the apparatus for the first user device;
   associate the allocated public IP address and the first plurality of NAT ports with a private IP address allocated for the first user device;
   assign a first NAT port of the first plurality of NAT ports to the first data connection; and
   prior to assigning at least one of the plurality of NAT ports to a data connection, update a mapping indicating the association between the first plurality of NAT ports and the private IP address;
   identify a second data connection associated with the first user device;
   upon determining that the first plurality of NAT ports does not include any Nat port that is not allocated to a data connection, assign a second NAT port of the first plurality of NAT ports to the second data connections;
   identify a third data connection associated with the first user device; and
   upon determining that the first plurality of NAT ports does not include any NAT ports that are not allocated to a data connection:
   allocate a second plurality of NAT ports to the first user device;
   associate the second plurality of NAT ports with the private IP address allocated for the first user device;
   assign a first NAT port of the second plurality of NAT ports to the third data connection; and
   update a mapping indicating the association between the second plurality of NAT ports and the private IP address, wherein at least one of the second plurality of NAT ports is not assigned to any data connection.

2. The apparatus of claim 1, wherein updating the mapping comprises initiating sending of a message indicating the association between the allocated public IP address, the plurality of NAT ports, and the private IP address to a server.

3. The apparatus of claim 2, wherein the one or more processors are further configured to refrain from updating the mapping upon assigning the second NAT port to the second data connection.

4. The apparatus of claim 1, wherein the apparatus is an access gateway coupled between an Internet and a radio access network.

5. The apparatus of claim 1, wherein the one or more processors are further configured to:
   allocate a second public IP address for the first user device;
   allocate a third plurality of NAT ports for the first user device; and
   associate the allocated second public IP address and the third plurality of NAT ports with the private IP address allocated for the first user device.

6. The apparatus of claim 1, wherein the one or more processors are further configured to:
   identify a fourth data connection associated with a second user device;
   in response to identifying the fourth data connection associated with the second user device, allocate the public IP address for the second user device and allocate a third plurality of NAT ports for the second user device; and
   associate the allocated public IP address and the third plurality of NAT ports with a private IP address allocated for the second user device.

7. The apparatus of claim 1, wherein the one or more processors are further configured to modify a header of a packet associated with the first data connection and destined for the first user device, wherein the header of the packet is modified to include the private IP address allocated for the first user device.

8. A method comprising:
   in response to identifying a first data connection associated with a first user device:
   allocating, by a gateway, a public Internet Protocol (IP) address for the first user device;
   allocating a first plurality of network address translation (NAT) ports on the gateway for the first user device;
   associating the allocated public IP address and the first plurality of NAT ports with a private IP address allocated for the first user device;
   assigning a first NAT port of the first plurality of NAT ports to the first data connection; and
   prior to assigning at least one of the plurality of NAT ports to a data connection, update a mapping indicating the association between the plurality of NAT ports and the private IP address;
   identifying a second data connection associated with the first user device;

upon determining that the first plurality of NAT ports includes at least one NAT port that is not allocated to a data connection, assigning a second NAT port of the first plurality of NAT ports to the second data connections;

identifying a third data connection associated with the first user device; and upon determining that the first plurality of NAT ports does not include any NAT ports that are not allocated to a data connection:

allocating a second plurality of NAT ports to the first user device;

associating the second plurality of NAT ports with the private IP address allocated for the first user device;

assigning a first NAT port of the second plurality of NAT ports to the third data connection; and updating a mapping indicating the association between the second plurality of NAT ports and the private IP address, wherein at least one of the second plurality of NAT ports is not assigned to any data connection.

9. The method of claim 8, wherein updating the mapping comprises sending a message indicating the association between the allocated public IP address, the plurality of NAT ports, and the private IP address to a server.

10. The method of claim 9, the method further comprising refraining from updating the mapping upon assigning the second NAT port to the second data connection.

11. The method of claim 8, wherein the gateway is an access gateway coupled between an Internet and a radio access network.

12. The method of claim 8, the method further comprising:

allocating a second public IP address for the first user device;

allocating a third plurality of NAT ports for the first user device; and associating the allocated second public IP address and the third plurality of NAT ports with the private IP address allocated for the first user device.

13. The method of claim 8, the method further comprising:

identifying a fourth data connection associated with a second user device;

in response to identifying the fourth data connection associated with the second user device, allocating the public IP address for the second user device and allocating a third plurality of NAT ports for the second user device; and associating the allocated public IP address and the third plurality of NAT ports with a private IP address allocated for the second user device.

14. The method of claim 8, the method further comprising modifying a header of a packet associated with the first data connection and destined for the first user device, wherein the header of the packet is modified to include the private IP address allocated for the first user device.

15. One or more tangible non-transitory computer readable media comprising logic that when executed is operable to:

in response to identifying a first data connection associated with a first user device;

allocate, on a gateway, a public Internet Protocol (IP) address for the first user device allocate a first plurality of network address translation (NAT) ports of the gateway to the first user device;

associate the allocated public IP address and the first plurality of NAT ports with a private IP address allocated for the first user device;

assign a first NAT port of the first plurality of NAT ports to the first data connection; and prior to assigning at least one of the plurality of NAT ports to a data connection, update a mapping indicating the association between the first plurality of NAT ports and the private IP address;

identify a second data connection associated with the first user device;

upon determining that the first plurality of NAT ports includes at least one NAT port that is not allocated to a data connection, assign a second NAT port of the first plurality of NAT ports to the second data connections:

identify a third data connection associated with the first user device; and upon determining that the first plurality of NAT ports does not include any NAT ports that are not allocated to a data connection;

allocate a second plurality of NAT ports to the first user device;

associate the second plurality of NAT ports with the private IP address allocated for the first user device;

assign a first NAT port of the second plurality of NAT ports to the third data connection; and update a mapping indicating the association between the second plurality of NAT ports and the private IP address, wherein at least one of the second plurality of NAT ports is not assigned to any data connection.

16. The media of claim 15, wherein updating the mapping comprises initiating sending of a message indicating the association between the allocated public IP address, the plurality of NAT ports, and the private IP address to a server.

17. The media of claim 15, wherein the logic when executed is further operable to:

allocate a second public IP address for the first user device;

allocate a third plurality of NAT ports for the first user device; and associate the allocated second public IP address and the third plurality of NAT ports with the private IP address allocated for the first user device.

18. The media of claim 15, wherein the logic when executed is further operable to:

identify a fourth data connection associated with a second user device;

in response to identifying the fourth data connection associated with the second user device, allocate the public IP address for the second user device and allocate a third plurality of NAT ports for the second user device; and associate the allocated public IP address and the third plurality of NAT ports with a private IP address allocated for the second user device.

19. The media of claim 15, wherein the logic when executed is further operable to modify a header of a packet associated with the first data connection and destined for the first user device, wherein the header of the packet is modified to include the private IP address allocated for the first user device.

* * * * *

UNITED STATES PATENT AND TRADEMARK OFFICE
CERTIFICATE OF CORRECTION

PATENT NO. : 10,587,571 B2
APPLICATION NO. : 14/796352
DATED : March 10, 2020
INVENTOR(S) : Prakash Babu et al.

Page 1 of 1

It is certified that error appears in the above-identified patent and that said Letters Patent is hereby corrected as shown below:

In the Specification

In Column 1, Line 7, delete "( and" and insert -- (and --, therefor.

In Column 1, Line 8, after "120)" insert -- of --.

In Column 2, Line 14, delete "FIG." and insert -- FIGS. --, therefor.

In Column 12, Line 26, delete "a the" and insert -- the --, therefor.

In the Claims

In Column 23, Line 57, in Claim 1, delete "does not include any Nat" and insert -- includes at least one NAT --, therefor.

In Column 23, Lines 59-60, in Claim 1, delete "connections;" and insert -- connection; --, therefor.

In Column 24, Line 14, in Claim 2, delete "N AT" and insert -- NAT --, therefor.

In Column 25, Lines 4-5, in Claim 8, delete "connections;" and insert -- connection; --, therefor.

In Column 25, Line 64, in Claim 15, delete "device" and insert -- device; --, therefor.

In Column 26, Line 16, in Claim 15, delete "connections:" and insert -- connection; --, therefor.

In Column 26, Line 21, in Claim 15, delete "connection;" and insert -- connection: --, therefor.

In Column 26, Line 35, in Claim 16, delete "N AT" and insert -- NAT --, therefor.

Signed and Sealed this
Nineteenth Day of May, 2020

Andrei Iancu
*Director of the United States Patent and Trademark Office*